US010296964B1

(12) United States Patent
Rausch et al.

(10) Patent No.: US 10,296,964 B1
(45) Date of Patent: May 21, 2019

(54) EFFORTLESS AND AUTOMATED REORDERING

(71) Applicant: Amazon Technologies, Inc., Reno, NV (US)

(72) Inventors: Daniel Benjamin Rausch, Seattle, WA (US); Nagendra Bage Jayaraj, Sunnyvale, CA (US); Bradley James Bozarth, Sunnyvale, CA (US); Anna Kim Lee, San Francisco, CA (US); Michael Martin Lee, San Jose, CA (US); Thomas Bruno Mader, Los Gatos, CA (US); Amir Pelleg, Seattle, WA (US); Laura Allison Ridlehoover, Seattle, WA (US); Richard David Young, Mission Viejo, CA (US)

(73) Assignee: Amazon Technologies, Inc., Seattle, WA (US)

(*) Notice: Subject to any disclaimer, the term of this patent is extended or adjusted under 35 U.S.C. 154(b) by 1281 days.

(21) Appl. No.: 14/469,336

(22) Filed: Aug. 26, 2014

(51) Int. Cl.
  G06Q 30/00 (2012.01)
  G06Q 30/06 (2012.01)
  H04B 1/3827 (2015.01)
  H04B 7/26 (2006.01)

(52) U.S. Cl.
  CPC ....... G06Q 30/0635 (2013.01); H04B 1/3833 (2013.01); H04B 7/26 (2013.01)

(58) Field of Classification Search
  CPC .................................................. G06Q 30/0635
  USPC .................................................... 705/26.81
  See application file for complete search history.

(56) References Cited

U.S. PATENT DOCUMENTS

| | | | |
|---|---|---|---|
| 5,305,199 A | 4/1994 | LoBiondo et al. | |
| 5,655,174 A | 8/1997 | Hirst | |
| 6,023,593 A | 2/2000 | Tomidokoro | |
| 6,204,763 B1 | 3/2001 | Sone | |
| 6,529,692 B1 | 3/2003 | Haines et al. | |
| 6,981,061 B1 * | 12/2005 | Sakakura | G06Q 40/04 |
| | | | 707/999.008 |
| 8,150,771 B1 | 4/2012 | Baram | |

(Continued)

OTHER PUBLICATIONS

Office action for U.S. Appl. No. 14/577,831, dated Aug. 18, 2016, Byrd et al., "Device Deregistration Using Forward-Chaining Encryption", 20 pages.

(Continued)

*Primary Examiner* — Yogesh C Garg
*Assistant Examiner* — Lalith M Duraisamygurusamy
(74) *Attorney, Agent, or Firm* — Lee & Hayes, P.C.

(57) ABSTRACT

An effortless and automated reordering system includes a dedicated electronic device with a simple button interface that, upon depression of the button, initiates a process of ordering (or reordering) a product associated with the device and a button on that device. The electronic device may store in memory a device identifier and button identifiers for each button as the basis for order request information. The stored data may be communicated to a fulfillment service (e.g., an online merchant, fulfillment center, etc.) for order identification processing. In some cases, an application provided by the fulfillment service may be executed on a secondary management device to allow a user to configure the electronic device to map the buttons to different products, and even different vendors, to facilitate reconfigurable order management.

20 Claims, 14 Drawing Sheets

(56) References Cited

U.S. PATENT DOCUMENTS

| | | | | |
|---|---|---|---|---|
| 8,310,985 B2* | 11/2012 | Harb | ................... | H04H 60/82 |
| | | | | 370/328 |
| 8,631,126 B2 | 1/2014 | Veiseh et al. | | |
| 8,799,165 B2 | 8/2014 | Kirillin et al. | | |
| 8,924,262 B2 | 12/2014 | Shuster | | |
| 8,966,599 B1 | 2/2015 | Barrows et al. | | |
| 9,124,573 B2 | 9/2015 | Chastain et al. | | |
| 9,141,779 B2 | 9/2015 | Shen et al. | | |
| 9,210,133 B2 | 12/2015 | Yau | | |
| 2001/0049846 A1 | 12/2001 | Guzzi et al. | | |
| 2002/0116286 A1* | 8/2002 | Walker | ................ | G06Q 10/087 |
| | | | | 705/26.1 |
| 2002/0163662 A1 | 11/2002 | Kaufman et al. | | |
| 2003/0105800 A1* | 6/2003 | Cullen | ................... | H04L 29/06 |
| | | | | 709/201 |
| 2012/0276891 A1 | 11/2012 | Bai | | |
| 2012/0284086 A1* | 11/2012 | McCaffrey | ............ | G06Q 30/02 |
| | | | | 705/7.35 |
| 2013/0166332 A1* | 6/2013 | Hammad | .............. | G06Q 40/10 |
| | | | | 705/5 |
| 2014/0344153 A1 | 11/2014 | Raj et al. | | |
| 2015/0163766 A1* | 6/2015 | Weiss | ................. | H04W 64/006 |
| | | | | 455/456.1 |

OTHER PUBLICATIONS

Office action for U.S. Appl. No. 14/577,831, dated Mar. 24, 2016, Byrd et al., "Device Deregistration Using Forward-Chaining Encryption", 12 pages.

* cited by examiner

EFFORTLESS AND AUTOMATED REORDERING

BACKGROUND

Managing the supply of frequently purchased products may be challenging. For example, many people may find it difficult to remember to reorder an item prior to running out of the item and experiencing a moment of need. In addition, consumers may find it difficult to schedule shopping trips to restock their supply. Further, consumers may find it cumbersome and inefficient to periodically repeat the same online ordering processes for frequently ordered products.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
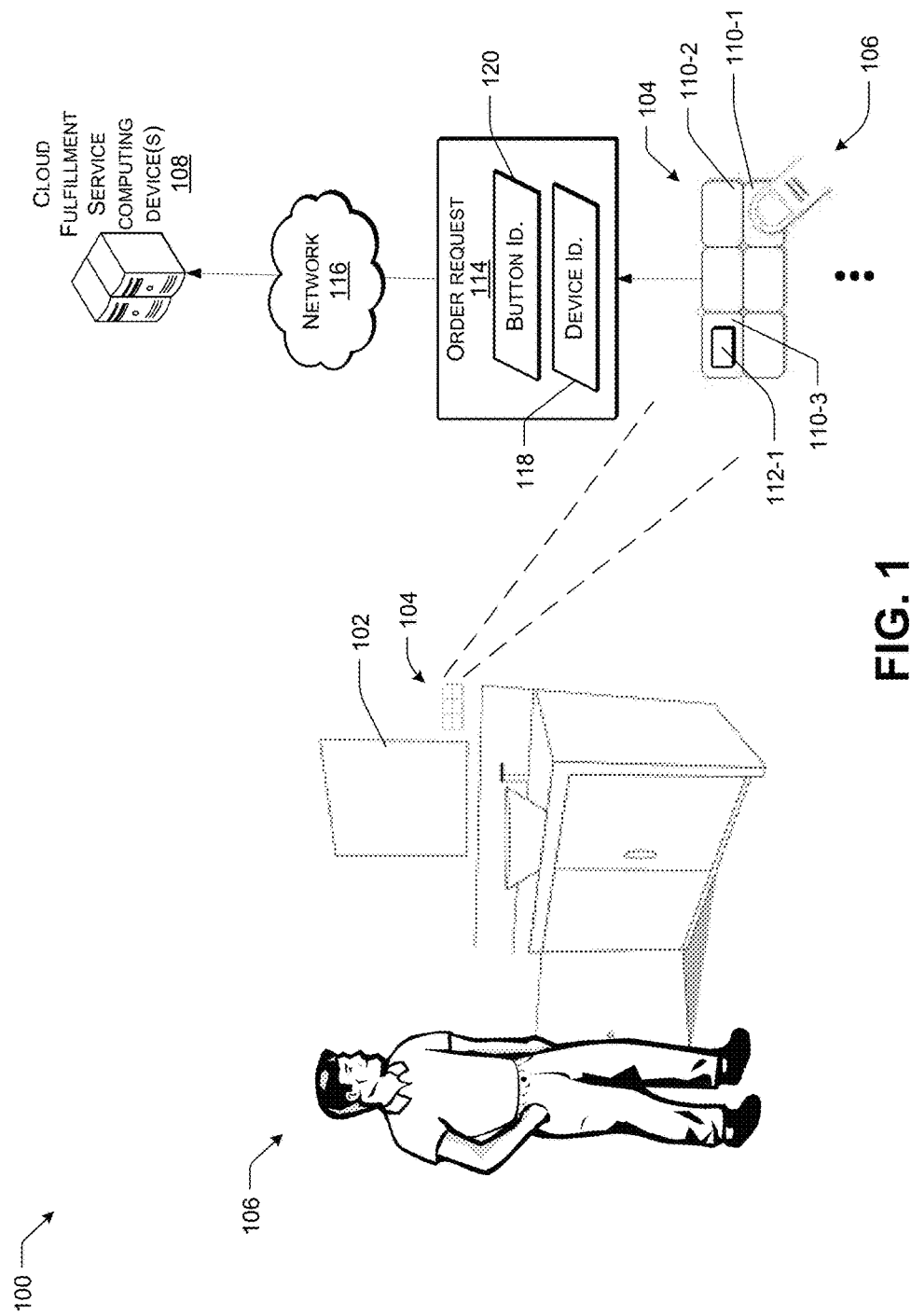
FIG. 1 illustrates an example framework for a fulfillment service that receives an order/reorder request from an electronic device, according to some implementations.

This disclosure includes, in part, techniques and arrangements for ordering (or reordering) products via a cloud fulfillment service (e.g., a retail fulfillment service) in an effortless and automated manner. The present disclosure describes a comparatively simple, dedicated electronic device that may be operated to allow a user to order products with minimal effort. In some embodiments, the electronic device may include a single actuatable button with very little electronics, processing, or memory capabilities other than to allow the user to generate and submit an order request to a fulfillment service. When the button is pressed, the electronic device may communicate sufficient information (e.g., device identifier information) that may be processed by the fulfillment service to order products. Upon receipt of the information, the fulfillment service may identify the products the user would like to order and customer information the fulfillment service may use to ship the products (e.g., shipping address, billing account, etc). In some cases, a user interface associated with the fulfillment service may allow the user to review and/or confirm an order prior to submission of the order for delivery.

In other cases, the device may include multiple buttons. Accordingly, when ordering a product, the electronic device may send both the device identifier and a button identifier to identify which of the buttons has been pressed.

In some examples, a fulfillment service application may be loaded and executed on the electronic device, or a separate secondary device (e.g., a smart phone), to register one or more buttons of an electronic device to order products for delivery by the fulfillment service. For instance, the fulfillment service application may provide a user interface that allows a user of the fulfillment service application to organize one or more products into an order and assign the order to a button of the electronic device. Further, the fulfillment service application may provide confirmation of the registration of the button. Once the registration is complete, the user may order the one or more products by simply pressing the button on the electronic device.

In some examples, a fulfillment service may manage the registration of electronic devices within the delivery system. The fulfillment service may receive registration requests from one or more registration devices in the delivery system. Further, the fulfillment service may extract registration information from a registration request, and store the registration information in a device registry. In some examples, the fulfillment service may verify that the registration request is authorized prior to the updating the registry. Further, once the fulfillment service stores the registration information in the registry, the fulfillment service may send a confirmation to the registration device. Once the registration is complete, a user of the electronic device may order the one or more products identified in the registration request by simply pressing a button identified in the registration request.

In some examples, an electronic device may send an order request to a fulfillment service. The transmission of the order request may be in response to the depressing of a button of the electronic device. Further, the order request may include a device identifier of the electronic device and an identifier of the depressed button. In some examples, the electronic device may receive an order confirmation from the fulfillment service in response to the order request. The order confirmation may provide information indicating whether the fulfillment service has accepted, denied, or suspended the order request. In some examples, the electronic device may receive a shipping confirmation from the fulfillment service. In some cases, the shipping confirmation may include shipping information such as the expected shipping date, expected date of delivery, and/or a tracking number.

In some examples, a fulfillment service may manage delivery orders within the delivery system. For example, the fulfillment service may receive an order request from an electronic device. Further, the fulfillment service may extract order identification information from the order request. In addition, the fulfillment service may retrieve order information from a device registry and customer account database based in part on the order identification information. The order information may include the order items and a customer account associated with order request. In some examples, the fulfillment service may determine whether to accept, deny or suspend the order request based in part on the order information. Further, the fulfillment service may send an order confirmation to the electronic device. The order confirmation may provide information indicating whether the fulfillment service has accepted, denied, or suspended the order request. Further, the fulfillment service may determine a financial account to charge and a shipping address based in part on the order information. In some examples, the fulfillment service may send a fulfillment request to a fulfillment system. The fulfillment request may include the order information that the fulfillment center may need to ship the order items to the user of the electronic device. In some examples, the fulfillment service may send a shipping confirmation. The shipping confirmation may include information received from the fulfillment system related to the fulfillment request (e.g., expected shipping date, expected date of delivery, tracking number, etc).

The electronic devices may be implemented in any number of physical and electronic configurations. The device may have a single button, or multiple buttons. The device may be configured to draw power from a conventional house outlet (e.g., through common prongs) or be equipped with an offline power source, such as a battery (e.g., rechargeable or otherwise). In some examples, the electronic device may employ a system for battery power management of the batteries. The electronic device may maintain a low power state while the electronic device is not in use and further limit power draw. In some examples, the electronic device will power down when the battery voltage present in the electronic device drops below a safe operating margin. Further, the electronic device may be prevented from powering up once the battery voltage falls below the safe operation margin.

FIG. 1 illustrates an example framework 100 for a fulfillment service that receives an order request from an electronic device, according to some implementations. FIG. 1 shows illustrative interactions within a bathroom environment 102 between an electronic device 104 affixed to a wall within the bathroom environment 102, a user 106, and a remote system of a fulfillment service 108 when performing various operations, including ordering products (e.g., toiletries) for home delivery.

The electronic device 104 may include one or more buttons 110, such as button 110-1, button 110-2, . . . , associated with products that the fulfillment service may deliver. Only some of the buttons are shown with the reference number 110 for ease of illustration. In some examples, the one or more buttons may be individually marked with labels 112, such as label 112-1, . . . , that indicate to the user 106 a product associated with the button 110-3 of the electronic device 104. In some cases, the label may be may be any textual or graphical indicia that can be displayed on a monitor of a computer, hand-held device, or printed paper. The label 112 may be affixed to an associated button 110, such as through an adhesive. Alternatively, the label 112 may be laser-etched onto the electronic device 104 for durability. Only some of the labels are shown with the reference number 112 for ease of illustration. There may be one label for each corresponding button, or fewer labels than buttons. In other implementations, the buttons may be differentiated from one another in other ways, such as through color coding, shape, or texture.

In the illustrative example of FIG. 1, suppose the user 106 opens a cabinet within the bathroom environment 102. While surveying the toiletries stored in the cabinet, suppose the user 106 determines that the current supply of a toothpaste product is low. In response, the user 106 may press a button 110-1 associated with the toothpaste product on the electronic device 104. In some examples, the button 110-1 may be marked with a label 112 that indicates the button 110-1 is associated with the toothpaste product. For instance, the button 110-1 may be labeled with the product logo of the toothpaste product. Alternatively, the button may have a corresponding number or letter (e.g., 6 or F), or distinctive color (e.g., blue) that is mapped in the user's mind to be associated with toothpaste.

Once the button 110-1 has been pressed, the electronic device 104 may send an order request 114 to the fulfillment service 108 via a network 116. In some examples, the order request 114 may include a device identifier 118 and a button identifier 120. The device identifier may be a universally unique identifier individually assigned to that electronic device 104 within the delivery system 100. In some examples, each device identifier may be only unique within the delivery system 100. In some cases, the device identifier 118 may include at least a MAC address of the electronic device. Typically, but not necessarily, each electronic device 104 stores its respective device identifier 118 in a memory component of the electronic device 104. Such device identifiers may be uniquely assigned during manufacturing of the electronic device, or the device may be assigned the unique device identifier post manufacturing during a configuration process.

The button identifier 120 identifies the specific button 110-1 that has been pressed by the user 106 from among the other possible buttons that may be actuated on the device 104. In this case, there are six buttons shown on the device 104 of FIG. 1. Accordingly, each of the buttons 110 is assigned an associated button identifier 120. The button identifier 120 may include a unique alphanumeric character, a positional descriptor (e.g., "bottom right"), or the like. Accordingly, the order request 114 generated upon the user pressing the button 110-1 of the electronic device 104 may include the MAC address 118 of the electronic device 104 and the button identifier 120 of the button 110-1 that the user has pressed.

The order request 114 is transmitted over a network 116 to the fulfillment service 108. In some cases, the network 116 may be a publicly accessible network of linked networks, possibly operated by various distinct parties, such as the Internet. In other embodiments, the network 116 may include a private network, personal area network ("PAN"), LAN, WAN, cable network, satellite network, etc. or some combination thereof, each with access to and/or from the Internet. For example, one or more computing devices associated with the fulfillment service 108 may be located within a single data center and may communicate via a private network.

In the illustrative example of FIG. 1, the fulfillment service 108 may receive the order request 114 containing the device identifier 118 of the electronic device 104 and the button identifier 120 of the button 110-1 of the electronic device 104 from the network 116. Upon receipt of the order request 114, the fulfillment service 108 may initiate shipment of the requested product, such as the toothpaste product in this example, based in part on the device identifier 118 and the button identifier 120 extracted from the order request 114.

More particularly, in one implementation, the fulfillment service 108 may use the device identifier 118 and button identifier 120 to query stored information and retrieve the name of the toothpaste product, an address of the user's residence in which the bathroom environment 102 belongs, and billing account of the user 106. The identifiers 118/120 (e.g., identifiers representing the "bottom-right" button of a particular device) may be associated, for example, in a database to product information associated with the toothpaste product, such as a product name, a Universal Product Code, a Stock-Keeping Unit code, and so forth. The device identifier 118 may correspond through data structures of a database (e.g., established during registration or product configuration) with account information associated with the user of the electronic device 104, such as shipping address, billing address, credit card account, bank account, rewards account, etc. The product identifier 118 and button identifier 120 may also be mapped via a data structure to purchase order information such as a quantity, size, applicable discounts, applicable coupons, and so on. The information retrieved from the databases (e.g., name of the toothpaste product, user address, and billing account of the user 106) may then be used for payment processing and delivering the toothpaste product to user 106. One example implementation of the operation of the framework architecture 100 is explained in greater detail with reference to FIGS. 2 and 3, as follows.

Figure 2:
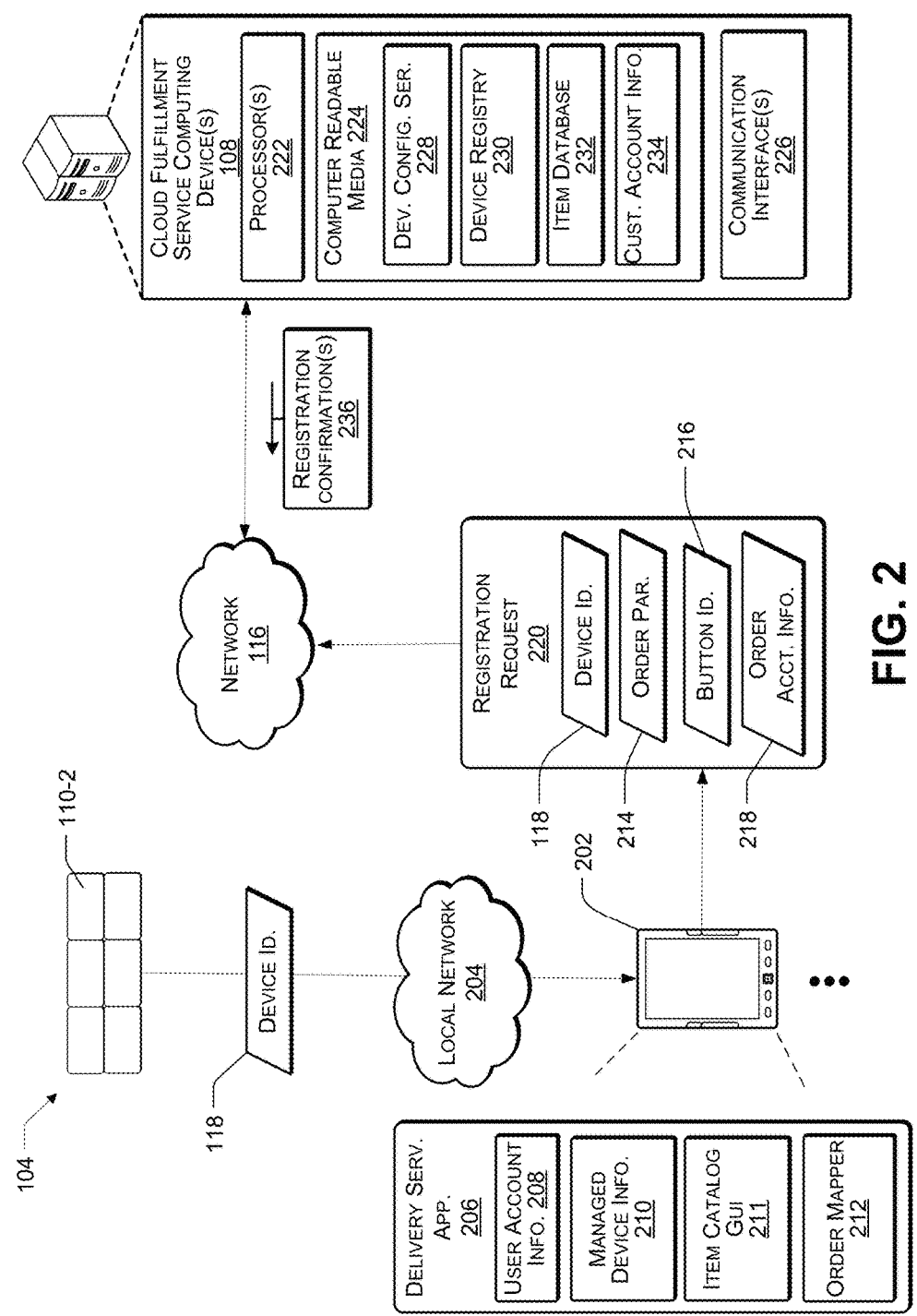
FIG. 2 illustrates an example framework for registering an electronic device to submit order/reorder request to a fulfillment service, according to some implementations.

FIG. 2 illustrates an example framework 200 for managing an electronic device, according to some implementations. FIG. 2 shows illustrative interactions between the electronic device 104, a management device 202, and the fulfillment service 108 when performing various operations, including registering the electronic device 104 with the fulfillment service 108. The management device 202 allows the user 106 to configure the buttons 110 of the electronic device 104 to order products from the fulfillment service 108. As discussed additionally below, some examples of the management device 202 may include smart phones and mobile devices; desktop, terminal and workstation computing devices; laptop and netbook computing devices; digital media devices and eBook readers; tablet computing devices; televisions; gaming systems; home electronic devices; automotive electronic devices; and any other device capable of collecting information and communicating the information to the fulfillment service 108.

In the illustrative example of FIG. 2, the electronic device 104 sends the device identifier 118 to the management device 202 over a local network 204. In some examples, the sending of the device identifier 118 may be triggered by input to the electronic device 104. For instance, the device identifier 104 may be sent to the management device 202 based on the user 106 (not shown in FIG. 2) pressing one or more of the buttons 110 of the electronic device 104 for a specified period of time (e.g., 5 seconds). In other examples, the management device 202 may send a request for the device identifier 118 to the electronic device 104 and the electronic device 104 may send the device identifier 118 in a response communication. Further, the electronic device 104 or management device 202 may provide audio and/or visual feedback to the user 106 to indicate successful transmission of the device identifier 118 to the management device 202.

The local network 204 may include both wired and wireless networks, such as cellular networks, radio, Wi-Fi networks, short-range or near-field networks (e.g., Bluetooth®), infrared signals, local area networks, wide area networks, private network, personal area network ("PAN") (e.g., IEEE 802.15.4/ZigBee®, Z-Wave®, etc), cable network, satellite network, the Internet, and so forth. Further, the management device 202 and the electronic device 104 may communicate and interact with one another using any combination of suitable communication and networking protocols.

In some examples, the management device 202 may include a fulfillment service application 206 (e.g., a smartphone application) programmed to communicate registration information between the electronic device 104 and the management device 202 via the local network 204, and between the management device 202 and the fulfillment service 108 via the network 116. The fulfillment service application 206 may include user account information 208, managed device information 210, an item catalog graphical user interface ("GUI") 211, and an order mapper 212. Additionally, or alternatively, the management device 202 may access a website (e.g., a fulfillment service website) that offers functionality similar to the fulfillment service application 206 via a web browser application.

The user account information 208 may store data associated with one or more fulfillment service user accounts established at the fulfillment service 108 for the one or more users of the electronic device 104 and/or the management device 202. The user account information 208 may include customer account identifiers, login information (e.g., usernames and passwords) to the fulfillment service 108, full names, email addresses, shipping addresses, billing addresses, credit card accounts, bank accounts, rewards accounts, and order history. Further, the fulfillment service application 206 may provide an interface for the entry and/or collection of the user account information 208.

The fulfillment service application 206 may further store the device identifier 118 received from the electronic device 104 as a managed device identifier in the managed device information 210. The managed device information 210 may further include data pertaining to the type of electronic device, the form factor of the electronic device 104, the features and functions of the device 104, the button layout, and so forth. In some cases, the fulfillment service application 206 may use any combination of this information (e.g., the button layout or form factor of the electronic device 104) when determining or selecting a button to register. In some examples, the fulfillment service application 206 may determine the form factor or button layout of the electronic device 104 based in part on the device identifier 118. In some other examples, the fulfillment service application 206 may receive the form factor or button layout of the electronic device 104 from the user 106 or the fulfillment service 108.

Once the fulfillment service application 206 stores the device identifier 118 in the managed device information 210, the fulfillment service application 206 may manage the buttons 110 of the electronic device 104. For instance, the fulfillment service application 206 may use the order mapper 212 to generate order parameters 214 that designate one or more products and a quantity for each of the one or more products, and to map a button 110 of the electronic device 104 to the order parameters 214. If the electronic device 104 has more than one button, the order mapper 212 allows the user 106 to select the button (e.g., button 110-2) of the electronic device 104 to map to the order parameters 214. In some examples, the fulfillment service application 206 may automatically select a button to configure on the electronic device 104. The selected button may be represented by a button identifier 216.

The order mapper 212 may further allow the user 106 to select one or more products to include in the order parameters 214. In some examples, the user 106 may provide a product identifier (e.g., product name, Universal Product Code, Stock-Keeping Unit code, barcode, a quick response (QR) code, radio-frequency identification (RFID) tag, a near-field communication (NFC) identifier, etc) to the order mapper 212 using an interface of the management device 202. For instance, if the user 106 endeavored to configure the button 110-2 to order a toothpaste product, the user 106 may type the name of the toothpaste product into a field of the fulfillment service application 206 using a keyboard of the management device 202.

In another example, the user 106 may select the product via the item catalog GUI 211. The item catalog GUI 211 may display a listing of one or more products and/or services offered for sale by the fulfillment service 108 and/or entities associated with the fulfillment service 108. Additionally, the user 106 may search for products to select by performing a query via the item catalog GUI 211.

In some other examples, the user 106 may select the one or more products from a list of previously ordered products stored in the user account information 208, and/or a list of products recommended to the user based on previously ordered products and/or other user account information 208. In still another example, the user 106 may utilize the management device 202 to optically scan the product and capture information, such as an image of the product or its product identifier (e.g., bar code), that may be used to identify the product.

Additionally, once the product is selected, the order mapper 212 may allow the user 106 to specify a quantity for each selected product. For example, the user 106 may specify that two containers of the toothpaste product should be ordered when the button 110-2 is pressed.

Further, the order mapper 212 may allow the user 106 to select order account information 218. The order account information 218 may identify user account information associated with the order parameters 214. In some examples, the order account information 218 may include data that the fulfillment service 108 employs to make various determinations, such as whether the user 106 is permitted to configure the button and whether the user 106 is permitted to order the selected products. This access control allows for some security protection to ensure that the correct user associated with the electronic device 104 is configuring the electronic device 104, and to allow different permissions among authorized users when ordering various products. The fulfillment service 108 may further use the data to determine a customer account to bill for the order and determine a shipping address for the products represented by the order parameters 214. For example, a user 106 may provide, as part of the order account information 218, a fulfillment service customer account that will be billed each time the toothpaste product is ordered.

In some examples, the order mapper 212 may generate a registration request 220 that includes the device identifier 118, the button identifier 216, the order parameters 214, and/or the order account information 218. Further, the fulfillment service application 206 may send the registration request 220 to the fulfillment service 108 via the network 212.

In the illustrated example, the fulfillment service 108 is implemented as cloud-based computing services hosted, for example, on one or more servers. These servers may be arranged in any number of ways, such as server farms, stacks, and the like that are commonly used in data centers. The cloud services generally refer to a network accessible platform implemented as a computing infrastructure of processors, storage, software, data access, and so forth that is maintained and accessible via a network such as the Internet. Cloud services do not require end-user knowledge of the physical location and configuration of the system that delivers the services. Common expressions associated with cloud services include "on-demand computing", "software as a service (SaaS)", "platform computing", "network accessible platform", and so forth The servers or computing devices used to host the fulfillment services 108 may include one or more processors 222, one or more computer-readable media 224, and one or more communication interfaces 226. The processor(s) 222 may be a single processing unit or a number of processing units, and may include single or multiple computing units or multiple processing cores. The processor(s) 222 can be configured to fetch and execute computer-readable instructions stored in the computer-readable media 224 or other computer-readable media.

The computer-readable media 224 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the fulfillment service computing device 108, the computer-readable media 224 may be a type of computer-readable storage media and may include tangible non-transitory storage media.

The communication interface(s) 226 may include one or more interfaces and hardware components for enabling communication with various other devices, such as the electronic device(s) 104, management device 202(s) 202 or other computing devices, over the network(s) 116. For example, communication interface(s) 226 may facilitate communication through one or more of the Internet, cable networks, cellular networks, wireless networks (e.g., Wi-Fi, cellular) and wired networks. As several examples, the fulfillment service computing device 108 and the management device 202 may communicate and interact with one another using any combination of suitable communication and networking protocols, such as Internet protocol (IP), transmission control protocol (TCP), hypertext transfer protocol (HTTP), cellular or radio communication protocols, and so forth.

In the illustrated example, the fulfillment service 108 implements a device configuration service 228, device registry 230, item database 232, and customer account information 234. The device configuration service 228 may receive the registration request 220 from the fulfillment service application 206 of the management device 202 and decide whether to accept the registration request 220. If the device configuration service 228 accepts the registration request 220, the device configuration service 228 may store the contents of the registration request 220 within the device registry 230.

The customer account information 234 may store account information of accounts within the fulfillment service 108. The customer account information 234 may include customer account identifiers, login information (e.g., usernames and passwords) to access customer accounts of the fulfillment service, identifiers of customer devices, full names, email addresses, shipping addresses, billing addresses, credit card accounts, bank accounts, rewards accounts, demographics, and order history. The item database 232 may store information for a plurality of items available for order by the fulfillment service 108, with each item associated with one or more product identifiers. The item database 232 may further include related product information (e.g., description, price, age restrictions, geographic restrictions, etc) for each item.

In some examples, the device configuration service 228 may authenticate the user 106 of the fulfillment service application 206 based on the customer account information 234 prior to accepting the registration request 220. For instance, if a username and password pair provided as order account information 218 in the registration request 220 does not match a username and password pair stored in the customer account information 234, the device configuration service 228 will deny the registration request 220. Further, the device configuration service 228 will not store the contents of the registration request 220 in the device registry 230.

In some examples, the device configuration service 228 may verify that the user 106 of the management device 202 is authorized to configure the electronic device 104 based on the customer account information 234 prior to accepting the registration request 220. For instance, if the device configuration service 228 determines that the user account 218 in the registration request 220 is not authorized to configure the electronic device 104 based on customer account information 234, the device configuration service 228 will deny the registration request 220. Further, the device configuration service 228 will not store the contents of the registration request 220 in the device registry 230.

Further, in some examples, the electronic device 104 may be restricted to ordering a specific product, line of products, brand, and/or set of products. For instance, the customer account information 234 may indicate the restrictions of the electronic device 104 and the customer accounts that are subject to the restrictions. For example, a vendor of a toilet paper product may distribute the electronic device 104 as a promotional gift. As such, the vendor may restrict the electronic device 104 to the toilet paper product. Therefore, if the device configuration service 228 receives a registration request 220 for the electronic device 104 wherein the order includes a toothpaste product, the device configuration service 228 may deny the registration request 220. As another example, a parent may purchase the electronic device 104 for a child, and limit the electronic device 104 to age appropriate products. Further, the parent may limit the electronic device 104 to products under a certain price range.

In still other examples, the device configuration service 228 may verify that a customer account associated with the order account information 218 in the registration request 220 is authorized to purchase one or more products based on the customer account information 234 and the item database 232. For instance, suppose the registration request 220 includes order parameters 214 representing an alcoholic beverage. The device configuration service 228 may determine that customer account information 234 indicates that the order account information 218 included in the registration request 220 is associated with a user under the age of 18, while only accounts belonging to users over the age of 21 may order an alcoholic beverage. Consequently, the device configuration service 228 will deny the registration request 220. Further, the device configuration service 228 will not store the contents of the registration request 220 in the device registry 230. As another example, suppose the registration request includes order parameters 214 representing a prescription medicine. The device configuration service 228 may determine that customer account information 234 indicates that the order account information 218 included in the registration request 220 is associated with a user 106 that has provided proof of a doctor's prescription for the prescription medicine. As a result, the device configuration service 228 may accept the registration request 220 and may store the contents of the registration request 220 in the device registry 230.

In some examples, the device configuration service 228 may convert and/or supplement the contents of the registration request 220 prior to storing the contents of the registration request 220 in the device registry 230. In some cases, the device configuration service 228 may source the supplemental information from the item database 232 and/or the customer account information 234. For example, the registration request 220 may only include the name of the toothpaste product. In response, the device configuration service 228 may query the item database 232 for additional product identifiers (e.g., Universal Product Code, Stock-Keeping Unit code, etc) associated with the toothpaste product. Further, the registration request 220 and the supplemental information may be stored together in the device registry 230. Additionally, or alternatively, the fulfillment service application 206 may query the device configuration application 228 for the supplemental information prior to generating the registration request 220, and include the supplemental information in the registration request 220.

In the illustrated example, the device configuration service 228 may send a registration confirmation 236 to the device configuration application 206 or the electronic device 104. The registration confirmation 236 may indicate whether the registration request 220 is accepted or denied. Further, if the device configuration service 228 denies the registration request 220, the registration confirmation 236 may indicate one or more reasons for denying the registration request 220. For example, if the device configuration service 228 determines that the user account 218 in the registration request 220 is not authorized to configure the electronic device 104, the registration confirmation 236 may indicate that registration request 220 is unauthorized.

Further, the fulfillment service application 206 may provide audio and/or visual feedback to the user 106 to indicate the result of the registration request 220 based on the registration confirmation 236. For example, if the fulfillment service application 206 receives a registration confirmation 236 indicating that the registration request 220 was accepted, the fulfillment service application 206 may present a dialog box notifying the user 106 of the management device 202 that the toothpaste product is registered to the button 110-2.

Additionally, the electronic device 104 may provide audio and/or visual feedback to the user 106 to indicate the result of the registration request 220 based on the registration confirmation 236. For example, if the electronic device 104 receives a registration confirmation 236 indicating that the registration request 220 was accepted, the electronic device 104 may illuminate an LED component or activate an audible buzzer (or other audio emitter) of the electronic device 104.

Figure 3:
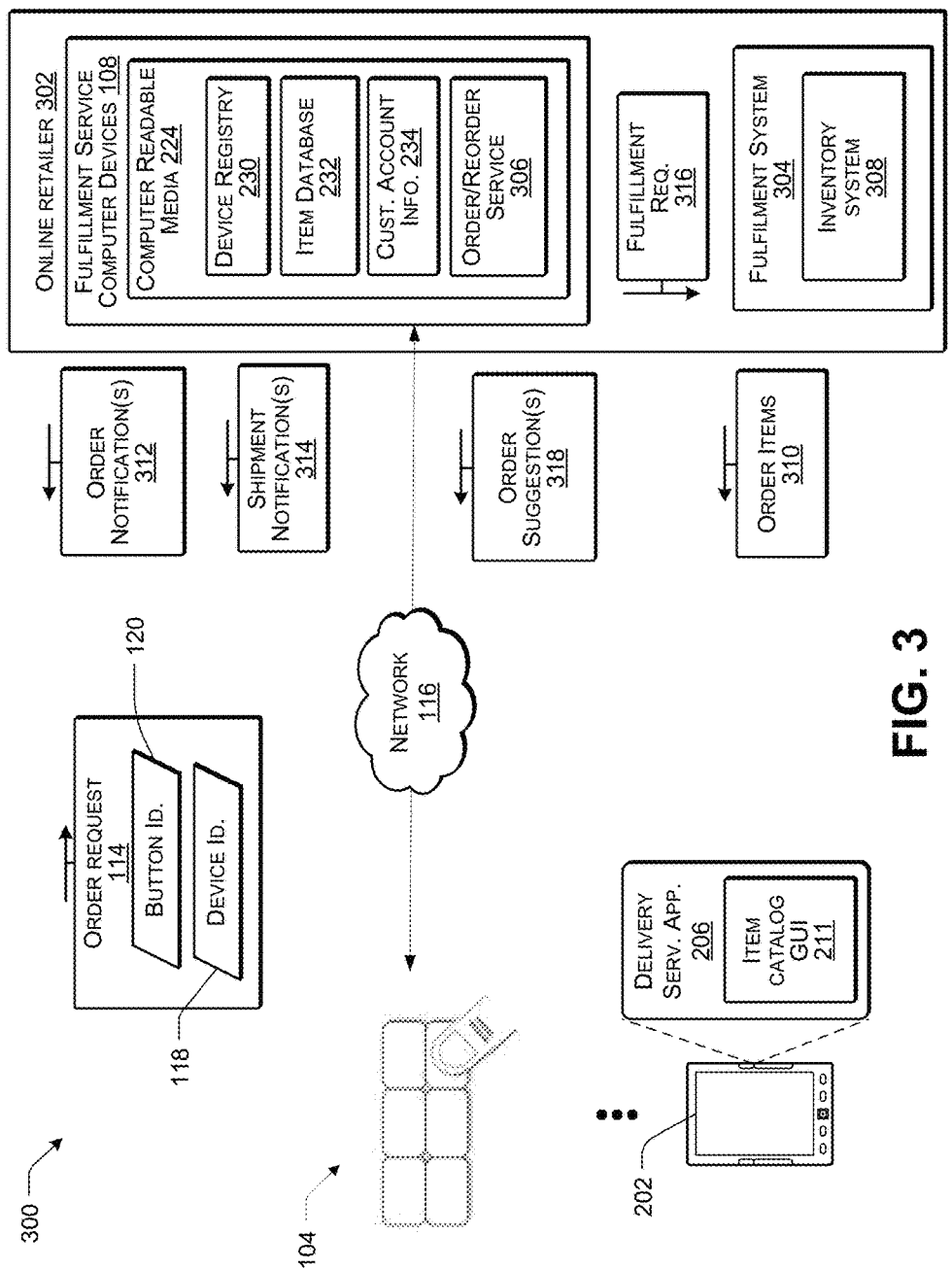
FIG. 3 illustrates an example framework for a fulfillment service that receives an order/reorder request from an electronic device and fulfills the order/reorder by shipping the order items, according to some implementations.

FIG. 3 illustrates an example framework 300 for ordering items using the electronic device and in response, fulfilling the order and delivering the items, according to some implementations. FIG. 3 shows illustrative interactions between the electronic device 104 and an online retailer 302 via the network 116. The online retailer 302 may include one or more fulfillment service computer devices 108 and one or more fulfillment system(s) 304. In some examples, one or more external servers or computing devices may be used to host the fulfillment system 304.

The online retailer 302 may further include computer readable media 224 which stores the device registry 230, the item database 232, customer account information 234, an order/reorder service 306, communication interfaces (not shown), and one or more inventories 308 of products or items being offered for sale by the merchant. In some examples, the online retailer 302 may display the products of the item database 232 for sale on a merchant website or a merchant application. For instance, in one implementation, the online retailer 302 may provide its products via the item catalog GUI 201 provided by the secondary management device 202.

In the illustrated example, the user 106 is pressing the button 110-1 of the electronic device 104. In response, the electronic device 104 may send an order request 114 to the fulfillment service computing device 108 of the online retailer 302 via a network 116. In some examples, the order request 114 may include order metadata. For instance, the order request 114 may include a device identifier 118 and a button identifier 120. For example, the electronic device 104 may send an order request 114 including the MAC address of the electronic device 104 and a numerical identifier of the first button 110-1 of the electronic device 104 (e.g., 1).

Additionally, and alternatively, order metadata may include any information that identifies an order item (e.g., product and/or service), item quantity, and/or account related with the electronic device 104. For example, the order request 114 may include a Universal Product Code (UPC), Stock-Keeping Unit (SKU) code, serial number, and/or other designation (including proprietary designations) that may be used as an identifier to facilitate the delivery of a product or provision of a service. As described above, the electronic device 104 may be configured to store the order metadata in a memory component of the electronic device 104. In some examples, the electronic device 104 may implement one or more data protection techniques to prevent modifications to the stored order metadata (e.g., tamper resistance, tamper proofing, hard coding, encryption, etc).

Further, the order/reorder service 306 may receive the order request 114 from the electronic device 104. Upon receipt of the order request 114, the order/reorder service 306 may retrieve the device identifier 118 and the button identifier 120 from the order request 114. The order/reorder service 306 may then determine the order item(s) 310 associated with the order request 114 and a customer identifier associated with the order request 114. In some examples, the order/reorder service 306 may search the device registry 230 to determine the ordered items 310 and the customer identifier. For example, the order/reorder service 306 may search the device registry 230 for an entry including the MAC address 118 of the electronic device 104 and the numerical identifier 120 of the first button 110-1 of the electronic device 104. The order/reorder service 306 may then extract order information (e.g., order items 310 and quantity) and a customer identifier of the user 106 account associated with the order request 114.

Further, the order/reorder service 306 may determine whether to accept, suspend, or deny the order request 114 based on the extracted order information and/or customer account information 234 associated with the customer identifier. For example, the order/reorder service 306 may determine that the receipt of the order request 114 may indicate potentially anomalous behavior in light of previous order information stored in the customer account information 234. For instance, the order/reorder service 306 may determine that recent user 106 activity associated with an order request 114 is unusual and/or suspicious in comparison to the user's previous order frequency, account balance patterns, and/or other activity patterns that may indicate fraudulent or accidental submission of an order request 114. In some examples, the order/reorder service 306 may determine that an order request 114 is unusual and/or suspicious based at least in part on a first value associated with recent user 106 activity exceeding a second value associated with a previous activity pattern (e.g., order frequency, account balance pattern, etc) by a threshold amount and/or a threshold percentage. As a result, the order/reorder service 306 may suspend the order request 114 until receiving confirmation from the user 106 that the order request 114 is valid, or deny the order request 114.

In some cases, the order frequency may include an average quantity of an item ordered over a period of time. For example, the order/reorder service 306 may determine the average quantity of toothpaste ordered each month by the user 106. Further, the order/reorder service 306 may determine whether the quantity of toothpaste ordered by the user 106 during the last month exceeds the average quantity of toothpaste ordered each month. In some other cases, the order frequency may include the percentage of order requests received from the user for a product (e.g., 10% of the user's order requests typically correspond to the product). In addition, the account transaction pattern may include an average amount of money spent by the user 106 over a period of time. For example, the order/reorder service 306 may determine the average amount of money spent by the user 106 each month. Further, the order/reorder service 306 may determine whether the amount of money spent by the user 106 during the last month exceeds the average amount of money spent each month by the user 106.

Further, if the user 106 typically sends five order requests a month, the order/reorder service 306 may suspend or deny the eleventh order request 114 received during the current month. In some other examples, the order/reorder service 306 may suspend or deny an order request 114 when the amount of order requests 114 received from the electronic device 104 over a period of time exceed a predefined threshold.

Further, in some implementations, the order/reorder service 306 may suspend the electronic device 104 from making any additional order requests 114 or limit the suspension to specific order items 310 (e.g., high priced orders, orders containing recently ordered products, etc). For example, if the amount of suspended or denied order requests 114 exceed a predefined threshold, the order/reorder service 306 may deny subsequent order requests 114 received from the electronic device 104 over a period of time. Additionally, and alternatively, the order/reorder service 306 may suspend one or more customer accounts related to the custom identifier from submitting order requests 114. Further, the order/reorder service 306 may implement the suspension of the electronic device 104 and/or one or more customer accounts related to the custom identifier by modifying the device registry 230 and/or the customer account information 234.

In some examples, the order/reorder service 306 may send an order notification 312 to the electronic device 104 indicating whether the order request 114 has been accepted, suspended, or denied. Upon receipt of the order notification 312, the electronic device 104 may provide audio and/or visual feedback indicating the contents of the order notification 312. In some examples, the order/reorder service 306 may also send the order notification 312 to the fulfillment service application installed on the secondary device 202 associated with the customer identifier, and/or an email address associated with the customer identifier. In some examples, the customer account information 234 may include the email address associated with customer identifier. Further, if the order request 114 is suspended or denied, the order notification 312 may provide instructions for validating the order request 114 or resubmitting the order request 114. In addition, if the order request 114 is accepted, the order notification 312 may provide instructions for canceling the order request 114. For instance, if the order/reorder service 306 accepts an order request 114 for three boxes of diapers, the order/reorder service 306 may send order notification 312 to the electronic device 104 indicating that the order has been accepted. Further, the order/reorder service 306 may send an email to the user 106 that includes a link to a web address the user 106 may visit if the user 106 would like to cancel the order request 114.

If the order request 114 is accepted, the order/reorder service 306 may charge one or more customer accounts related to the custom identifier for the cost of the order items 310. For example, the order/reorder service 306 may determine the credit card account of the user 106 based on the customer identifier and the customer account information 234, and charge the credit card account for the cost of the three boxes of diapers. In some examples, the order/reorder service 306 may apply one or more discounts, or provide one or more credits/rewards to the customer account based on the customer account information 234. For instance, if the customer account information 234 indicates that the customer account is entitled to a ten percent discount on diapers, the order/reorder service 306 may reduce the cost of the diapers order accordingly.

In addition, the order/reorder service 306 may send a shipment notification 314 to the electronic device 104 or the secondary management device 202. In some examples, the order/reorder service 306 may send a shipment notification 314 to the electronic device 104 or secondary device 202 after charging the customer account associated with the order request 114 for the cost of order items 310. Further, the shipment notification 314 may include an expected date of delivery and other shipping information the user 106 may use to track the shipment of the order items 310. In some examples, the order/reorder service 306 may receive the shipping information from the fulfillment system 304. In some other examples, the fulfillment system 304 may send the shipment notification 314.

Upon receipt of the shipment notification 314, the electronic device 104 may provide audio and/or visual feedback indicating the contents of the order notification 312. In some examples, the order/reorder service 306 may also send the shipment notification 314 to the fulfillment service application 206 installed on a device associated with the customer identifier and/or an email address associated with the customer identifier. For instance, the order/reorder service may send an email to the user 106 indicating that the three boxes of diapers will be delivered within a 3 to 7 day span. Further, the shipment notification 314 may provide instructions to the user 106 for modifying information related to the shipment of the order items 310.

In addition, the order/reorder service 306 may instruct the fulfillment system 304 to ship the order items 310. In some examples, the order/reorder service 306 may send a fulfillment request 316 to the fulfillment system 304. The fulfillment request 316 may include one or more identifiers (e.g., product name, Universal Product Code, Stock-Keeping Unit code, etc) of the order items 310 and shipping information associated with the order request 114. In some examples, the order/reorder service 306 may retrieve the shipping information from the device registry 230 or the customer account information 234. For instance, device registry 230 may indicate that the order items 310 are to be shipped to a shipping address that differs from the default shipping address stored in the customer account information 234. As a result, the fulfillment request 316 may include the shipping address indicated in the device registry 230. Alternatively, the device registry 230 may indicate that the order items 310 are to be shipped to an address contained in the customer account information 234. Once the fulfillment system 304 receives the fulfillment request 316, the fulfillment system 304 may retrieve the order items 310 from the inventory system 308 and ship the order items 310 to an address included in the shipping information of the fulfillment request 316.

In some examples, the order/reorder service 306 may notify the user 106 of recommended products and/or products in the item database 232 available at a reduced price. In some examples, the order/reorder service 306 may send order suggestions 318 to the fulfillment service application 206 or a communication endpoint associated with a customer account (e.g., telephone phone number, email address, etc). In some examples, the order suggestion 318 may be based on the customer account information 234 and/or the device registry 230. For instance, if the customer account information 234 and/or the device registry 230 indicate that a customer orders diapers, the order/reorder service 306 may send an order suggestion 318 to the customer including a recommendation for other products for young children. In some examples, the order/reorder service 306 may send an order suggestion 318 including sale items when the customer account information 234 indicates that the user 106 is likely to send an order request 114 around the time period the items are offered for sale. For instance, if the user 106 customarily sends an order request 114 for diapers at the beginning of every month, the order/reorder service 306 may send an order suggestion 318 to the user 106 indicating that diapers are on sale at the beginning of the month.

Further, the order/reorder service 306 may send order suggestions that include suggested button configurations. In some cases, the order/reorder service 306 may determine that a plurality of products ordered by the user 106 using the fulfillment service 108 share a similar order pattern, and send an order suggestion 318 to the user that recommends the user 106 register the products to a common button 110. For example, the order/reorder service 306 may determine that the user 106 frequently orders diapers and moist towelettes at the same time of the month with a shared frequency, and send an order suggestion 318 that recommends the user configure a button 110 of the electronic device to order both diapers and towelettes.

Figure 4A:
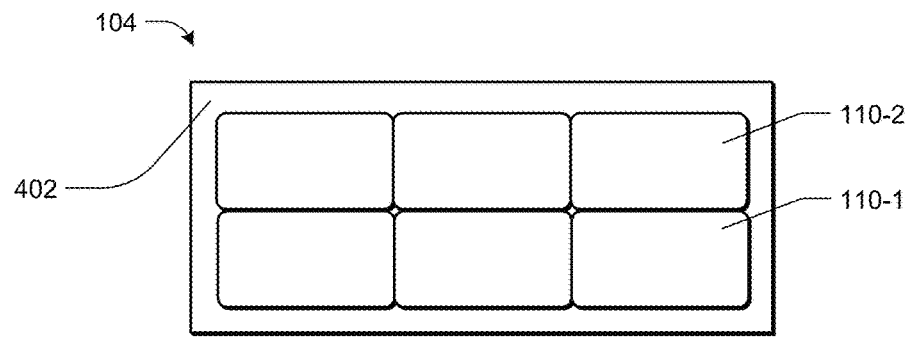
FIGS. 4A-4C illustrate examples of an electronic device, according to some implementations.
Figure 4B:
Figure 4C:
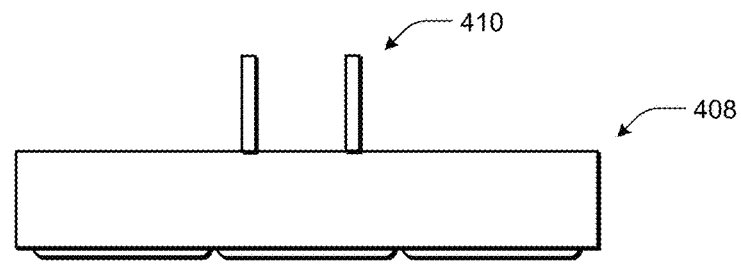

FIGS. 4A-4C show two exemplary embodiments of the dedicated electronic device. As illustrated in FIG. 4A, the electronic device 104 includes a housing 402 and multiple buttons 110, such as button 110-1, button 110-2, . . . , arranged in a grid pattern of rows and columns. Only some of the buttons are shown with the reference number 110 for ease of illustration. Further, in the example illustrated in FIG. 4A, the housing is substantially longer in a first dimension (e.g., length) than a second dimension (e.g., height) or third dimension (e.g., width). Thus, the housing 402 has a substantially rectangular, cuboidal shape. In addition, the housing 402 has a shape substantially corresponding to a convex polyhedron having six faces, eight vertices and twelve edges. In some examples, when assembled, the electronic device 104 may be substantially rectangular-shaped in an X-Y plane, with dimensions of about 75 mm×37 mm. While six buttons are shown in the implementation of FIGS. 4A-C, more or less than six buttons may be used in other implementations, and organized in other arrangements different from the grid pattern.

Referring to FIG. 4B, a battery powered embodiment 404 of the electronic device is shown. As illustrated in FIG. 4B, the electronic device 404 is configured to receive one or more batteries 406. The batteries 406 may include removable batteries, such as standard primary (single-use) or secondary (rechargeable) cells. Further, the number of batteries is meant to be illustrative and not limiting. In some other examples, the electronic device 502 may receive power from alternative numbers of batteries (e.g., single battery) and/or alternative sizes of batteries (e.g., AAA size).

Referring to FIG. 4C, a plug powered embodiment 408 of the electronic device 104 is shown. As illustrated in FIG. 4C, the battery power embodiment 408 includes a pair of prongs 406 that are integrated within the housing 402 of the plug powered embodiment 408. The prongs 406 are male electrical connectors that interface mechanically and electrically with corresponding mating connectors in an outlet. Prongs 406 may also include pins, contacts, or terminals.

Figure 5A:
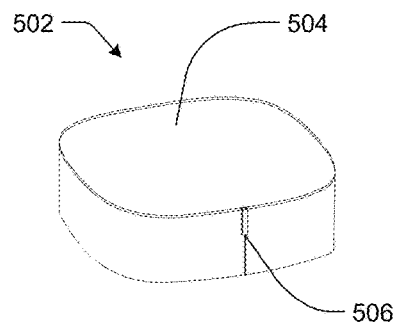
FIGS. 5A-5D illustrate example form factors of the electronic device, according to some implementations.

FIGS. 5A-5D show other example implementations of a dedicated electronic device. Referring to FIG. 5A, an electronic device 502 has an assembly structure or form factor with a rounded cuboidal shape with an upper surface into which a button 504 may be integrated as the upper surface. The electronic device 502 may further include a light pipe 506 to emit light for various operations and user feedback. The light pipe 506 may be arranged in any manner on the device 502. The light pipe 506 is connected to electronic and/or structural components, and at least one or more light sources may be included to illuminate the light pipe 506.

Figure 5B:
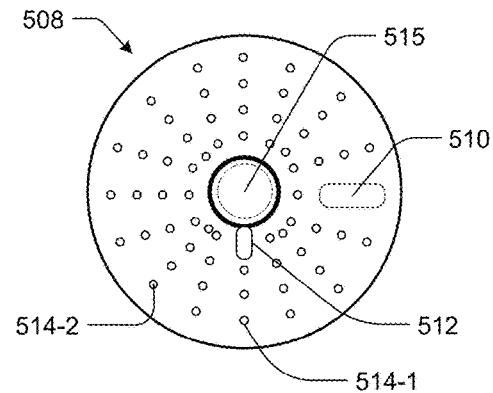

In FIG. 5B, an electronic device 508 has an assembly structure or form factor that is substantially circular from a top view. The electronic device 508 includes a label 510, a microphone 512, and one or more speaker grilles 514, such as 514-1, 514-2, . . . , to emit sounds from a speaker hidden beneath the top surface. Only some of the speaker grilles are shown with the reference number 514 for ease of illustration. In some examples, the label 510 may be a text and/or graphical mark that may indicate a product, brand, company, and/or retailer associated with the electronic device 508. In some examples, a user may speak into the microphone 512 in order to trigger the electronic device 508 to send an order request 114 to the fulfillment service 108. A button 515 may also be provided in the device 508, wherein the user may push the button 515 to initiate a verbal ordering process. Further, the device 508 may include a power plug to facilitate being powered by an electrical outlet.

Figure 5C:
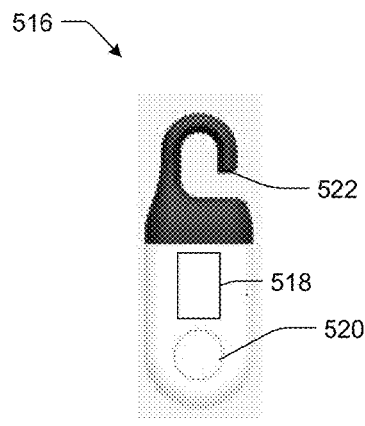

Referring to FIG. 5C, an electronic device 516 has a form factor with a more linear shape. The device 516 includes a label 518, a button 520, and a handle 522. In the example of FIG. 5C, the handle 522 is a substantially circular-shaped appendage (or another shape, such as a rectangle), and may allow the user 106 to hang the electronic device from a hook for safe-keeping (e.g., in a kitchen or pantry area, among other alternatives).

Figure 5D:
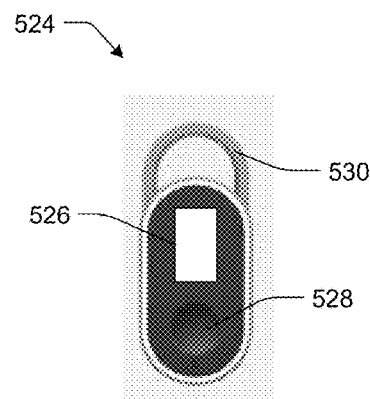

FIG. 5D shows yet another electronic device 524 with an assembly structure or form factor that is oval in shape. The device 524 includes a label 526, a button 528, and a handle 530. Similar to device 516 of FIG. 5C, the handle 530 is substantially circular-shaped (or another shape, such as a rectangle), and may allow the user 106 to hang or attach the electronic device for safe-keeping (e.g., to a keychain, among other alternatives).

Further, in some examples, the body of the devices 516 and 524 may be magnetic. Therefore, the user 106 may affix an electronic device 524 to metal objects.

In each of these devices of FIGS. 5A-D, the buttons may be implemented as physical buttons that are physically movable between a first or rest position when the button is not actuated and a second or actuated position when the button is depressed. In other implementations, the buttons may be physical buttons that respond to touch, but do not move. In still other implementations, the buttons may be implemented as soft buttons on a display that may be actuated by touch.

Figure 6:
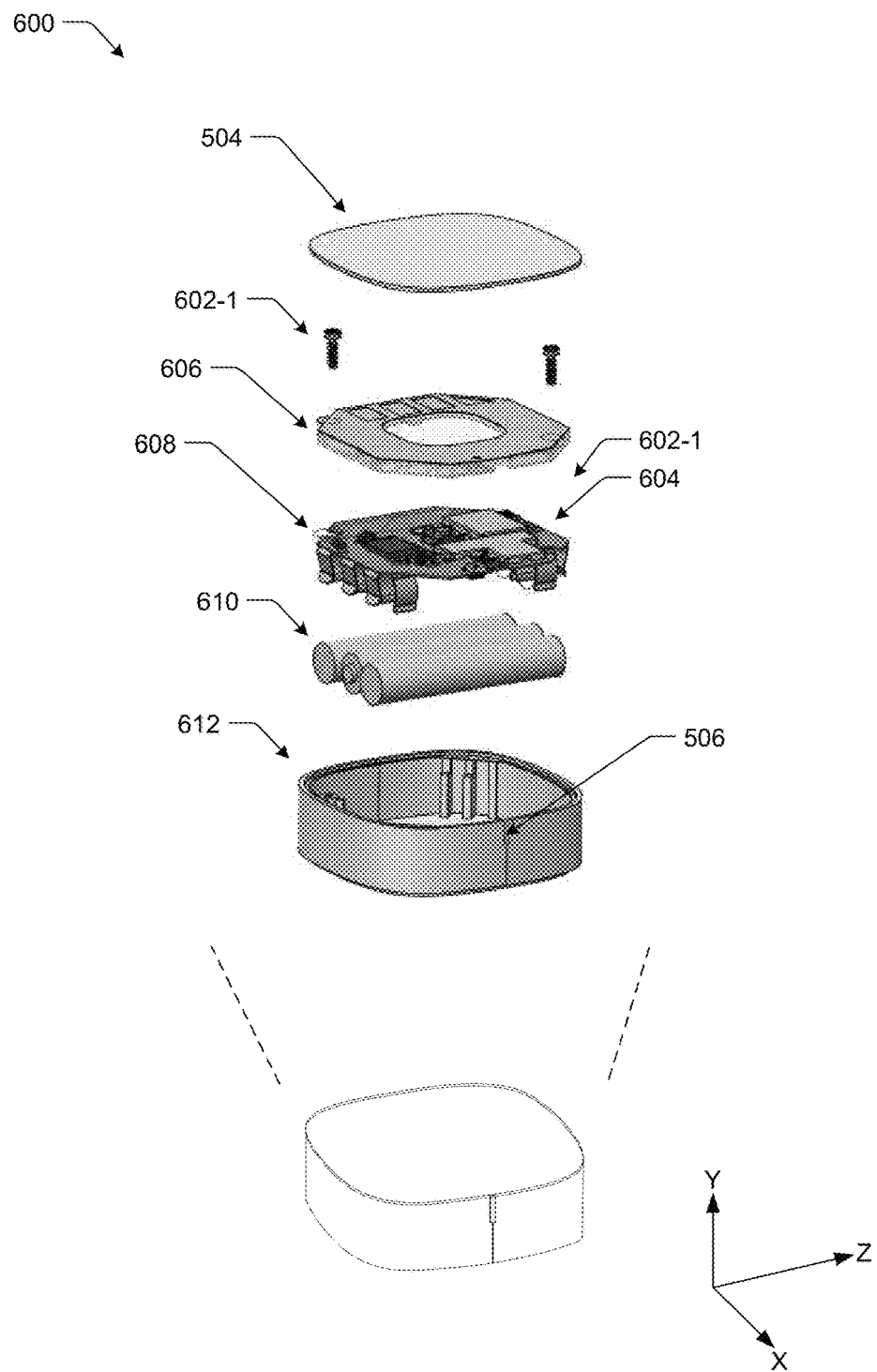
FIG. 6 illustrates an exploded view of select components of the example electronic device of FIG. 5A, according to some implementations.

FIG. 6 illustrates an exploded view of select components of the example electronic device 502 of FIG. 5A. The electronic device 502 includes the button 504, one or more screws 602 (e.g., self-threading screws), such as a first screw 602-1 and a second screw 602-2, an adhesive 604 (e.g., double sided self-adhesive tape), a spacer 606, a main printed circuit board (PCB) 608, one or more batteries 610 (e.g., three AAAA batteries are shown), a housing 612, and the light pipe 506. Particular components of the main PCB 608 are further illustrated in FIG. 6.

The housing 612 has a substantially cuboidal shape and encloses the electronics of the main PCB 608, batteries 610, and spacer 606. In some examples, when assembled, the electronic device 600 may be substantially rectangular-shaped in an X-Y plane, with dimensions of about 49 mm×14 mm. The electronic device 600 may have a Z-axis dimension of about 49 mm. FIG. 6 further illustrates that the structure of the housing 612 may have an opening, such as the light pipe 506.

In the example illustrated, the button 504 may be attached to the spacer 606 by an adhesive 604. The screws 602 may be used to attach the spacer 606 and the main PCB 608 to the housing 612. The spacer 606 and button 504 allow some physical movement with respect to the underlying PCB 604 so that the button may move between a rest position and an actuated position. When the button 504 is depressed, it or the spacer 606 makes contact with an electronic switch or detection sensor on the PCB 608. When contacted, the switch or sensor generates a signal that is passed to a controller on the PCB 608. The PCB uses the signal to detect when the button 504 is pressed. One particular implementation of the PCB 608 is described below in more detail with reference to FIG. 7.

The batteries 610 may be removeably affixed to the main PCB 608. While AAAA batters are illustrated, the electronic device 502 may receive power from alternative numbers of batteries (e.g., a single battery) and/or alternative sizes of batteries (e.g., AAA size). Further, alternative types of removable batteries, such as standard primary (single-use) or secondary (rechargeable) cells, may be used.

Figure 7:
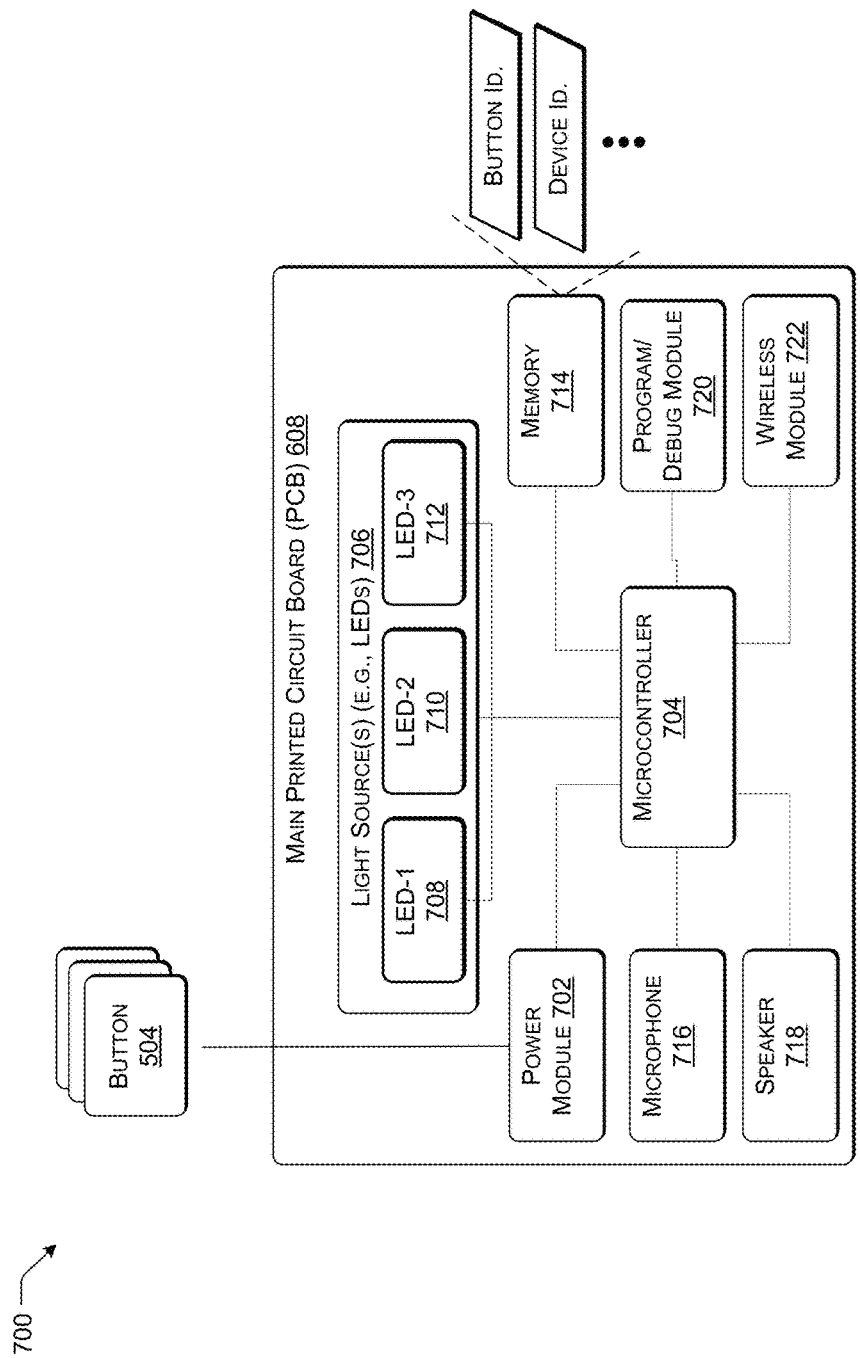
FIG. 7 is a block diagram illustrating select components of the example electronic devices of FIGS. 1-6, according to some implementations.

FIG. 7 illustrates select electronic components of the electronic device 104 (and 502), which are generally designated as 700. The device 700 includes one or more buttons 502 and primary components of the PCB 608. When a user selects a button 504 (e.g., a button press), a signal is generated and power module 702 powers up the main PCB 608. The power module 702 may be electrically connected to a microcontroller 704 on the main PCB 608. In a particular embodiment, the microcontroller 704 may include one or more processors with embedded memory (e.g., a 1 MB Flash memory) and static random-access memory (SRAM), such as a 122 KB static SRAM. In some other examples, the microcontroller may include one or more microprocessors, and/or one or more application processors.

FIG. 7 further illustrates that the microcontroller 704 may be connected to one or more light sources 706, such as light emitting diodes (LEDs), that may be illuminated to provide visual feedback. The one or more light sources 706 include a single-package three-die LED to display different colors (e.g., red, white, brilliant yellow, or a combination thereof). For example, a first light source 708, identified as LED-1 in FIG. 7, may correspond to an LED that displays a first color (e.g., red). A second light source 710 identified as LED-2 in FIG. 7, may correspond to an LED that displays a second color (e.g., white). A third light source 712, identified as LED-3 in FIG. 7, may correspond to an LED that displays a third color (e.g., 4 brilliant yellow). The light emitted by these light sources 706 may be conveyed to the light pipe that is exposed externally of the housing so that users can view the visual cues provided by the different color lights.

FIG. 7 further illustrates that the microcontroller 704 may be communicatively coupled to a memory 714 (e.g., serial flash memory) that is used to store any number of data and/or applications depending upon implementation. As a basic implementation, the memory 714 stores at least the device identifier and may further store, in a multiple button implementation, one or more button identifiers associated with one or more buttons. In addition, the memory 714 may store various sound files, one or more audio files, programs to be executed by the microcontroller, and so on.

A microphone 716 is mounted on the PCB 608 and electrically coupled to the microcontroller 704. In a particular embodiment, the microphone 716 may include an omnidirectional digital microelectromechanical systems (MEMS) microphone. The user's near-field voice audio data may be captured via the microphone 716 (which may include a bottom port and an integrated interchip sound (I2S) digital output). In a particular embodiment, the microphone 716 may utilize a MEMS audio sensor, signal conditioning, an analog-to-digital converter, anti-aliasing filters, power management, and an I2S interface (e.g., a 24-bit I2S interface to the microcontroller 704 of the main PCB 608 illustrated in FIG. 3). In some implementations, the microphone 716 may have a frequency response parameter corresponding to a low to high frequency range with an average low frequency of about 60 Hz and an average high frequency of about 15,000 Hz. Further, the microphone 716 may have an accuracy parameter corresponding to a number of active bits with an average of about 24 bits and may have a signal to noise ratio (SNR) parameter with an average SNR of about 61 dBA.

A speaker 718 is coupled to the microcontroller 704 to provide audio feedback or play audio files. In some cases, the speaker 718 may include a piezoelectric buzzer under pulse-width modulation (PWM) control. The speaker 718 may be activated by a PWM signal under general-purpose input/output (GPIO) control by the microcontroller 704. In a particular embodiment, the speaker 718 may have a resonant frequency of about 4 KHz. Other tones (i.e., frequencies) may be generated under firmware/PWM control by the microcontroller 704.

A programming/debug module 720 is provided to facilitate configuration and debugging of the device 700. The module 720 may be implemented to receive instructions from the remote management device (e.g., device 202) to program the various buttons for associated products and other order information.

A wireless module 722 (e.g., a Wi-Fi module) is also implemented by the device 700. The wireless module 722 may include hardware, such as an Institute of Electrical and Electronics Engineers (IEEE) 802.11b/g/n single band (e.g., 2.4 GHz) radio that may communicate via a single antenna. In some cases, the wireless module 722 may have a maximum transmission (Tx) power of about +19 dBm (CCK) for 802.11b communications, a maximum Tx power of about +18 dBm (11g OFDM) for 802.11g communications, and a maximum Tx power of about +18 dBm (11n MCSO) for 802.11n communications.

The wireless module 722 may be activated to establish a wireless connection (e.g., with a wireless access point (WAP) of the user 106). In some cases, the microcontroller 704 may be configured to activate the wireless module 722 in order to establish a wireless connection with a particular WAP based on connection information that may be stored in the memory 714. After establishing the wireless connection, information stored in the memory 714 (e.g., one or more audio files, one or more device identifiers, or combination thereof) may be communicated to a fulfillment service and/or management device 202 for processing.

Figure 8:
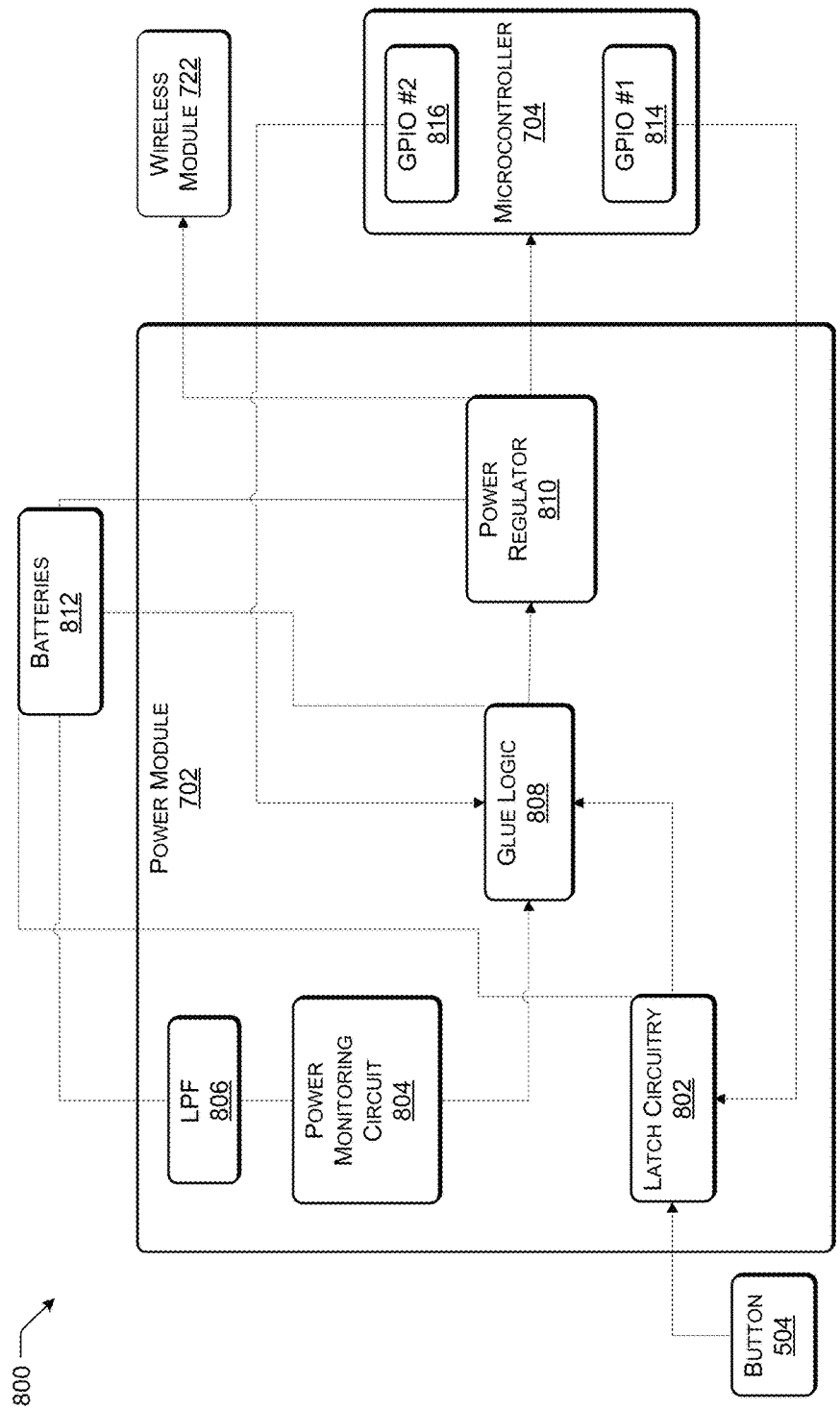
FIG. 8 is a block diagram illustrating select components of the example electronic devices of FIGS. 1-6, according to some implementations.

FIG. 8 illustrates select components of the electronic device 104 (and 502), including multiple components associated with the power module 702, which are generally designated as 800. The power module 702 may include latch circuitry 802, power monitoring circuitry 804, a low pass filter 806, glue logic 808, a power regulator 810. Further, the latch circuitry 802, a low pass filter 806, a power regulator 810 may be connected to the battery voltage input of one or more batteries 812, such as batteries 610. In addition, the power module 702 may be connected to the microcontroller 704 and the wireless module 722. Further, the power regulator 810 may provide power to the microcontroller 704 and the wireless module 722. FIG. 8 further illustrates that the microcontroller 704 may include one or more general-purpose input/output (GPIO) interfaces, such as GPIO-1 814 and GPIO-2 816.

FIG. 8 further illustrates that upon installation of the batteries 812, the latch circuitry 802 keeps the power regulator 810 disabled. Further, the power module 702 is in a shutdown state and does not provide any power to the microcontroller 704. Once user input is received, such as through push of the button 504, the latch circuitry 802 enables the power regulator 810.

In some examples, when the power regulator 810 is enabled, the power module 702 is powered up and the power regulator 810 may provide power to the microcontroller 704. Once the microcontroller 704 receives power, the microcontroller 704 may perform one or more operations, and then enter a shutdown safe state. In some examples, the microcontroller 704 may enter a shutdown safe state once the microcontroller 704 has completed the one or more operations. Once the shutdown safe state is reached, the microcontroller 704 may drive one or more pins of the microcontroller 704, such as GPIO-1 814. As a result, the power module 702 may enter a shutdown state. In some examples, the power regulator 810 may use internal or external active discharge circuitry to discharge the battery voltage in the power module 702.

FIG. 8 further illustrates that the power monitoring circuitry 804 may monitor the battery voltage input of the one or more batteries 812. In some examples, the power monitoring circuitry 804 may shutdown the power module 702 once the battery voltage input drops below a safe operating margin. The power monitoring circuitry 804 may also prevent the power module 702 from powering up once the battery voltage input drops below the safe operating margin. In some examples, the pins of GPIO-2 816 can be driven to avoid any false triggering of the power monitoring circuitry 804 due to transients. The architecture described herein with respect to FIG. 8 ensures that the power module 702 maintains the lowest power mode when the power module 702 is not in use. This, in turn, prolongs the life of the batteries 812 by limiting power draw, and provides added convenience to a user.

Figure 9:
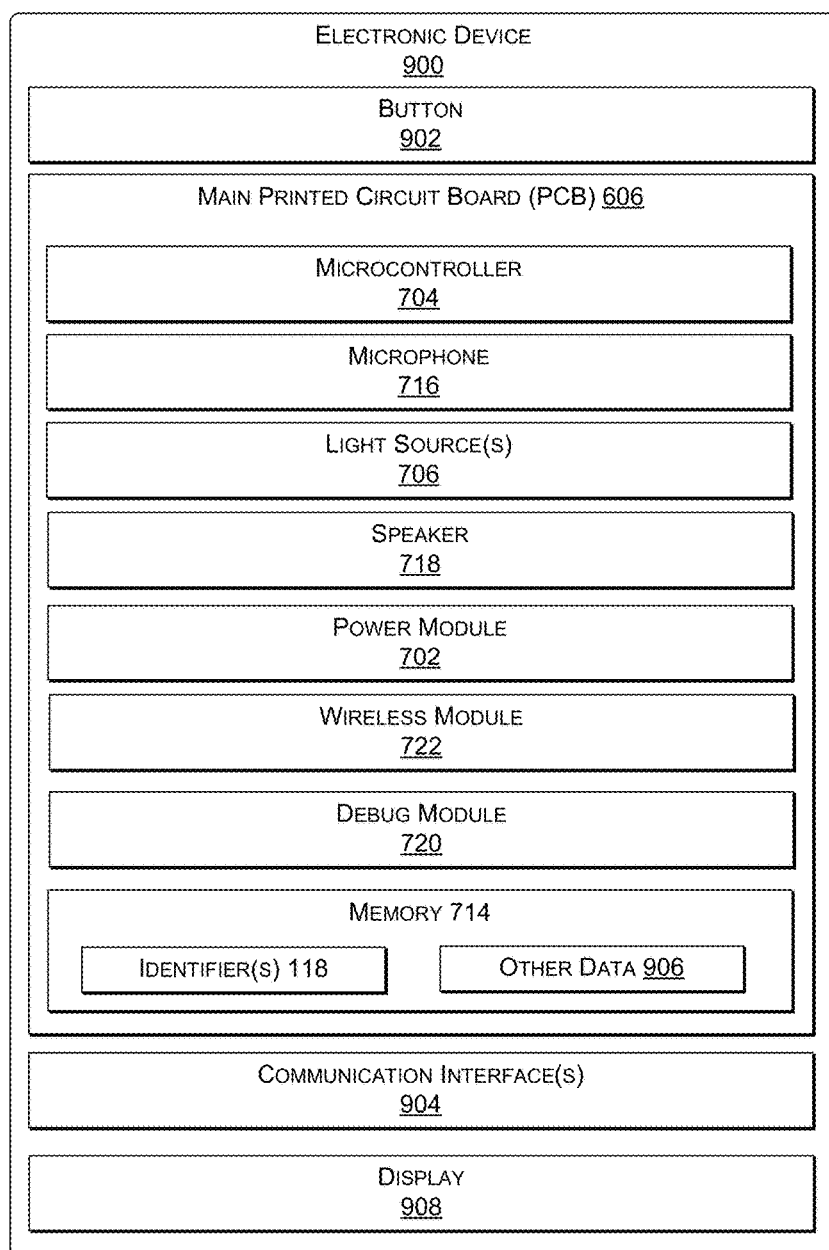
FIG. 9 illustrates select components of an example electronic device, according to some implementations.

FIG. 9 illustrates select example components of an electronic device 900 that may be used to implement the functionality described above according to some implementations. The electronic device 900 illustrated in FIG. 9 may correspond to the electronic devices 104 and 502. In a very basic configuration, the electronic device 900 includes, or accesses, components such at least one processor (e.g., the microcontroller 704 of FIG. 7) and a memory (e.g., the memory 714 of FIG. 7). Each processor may itself comprise one or more processors or cores. The processor(s) can be configured to fetch and execute computer-readable instructions stored in the memory 714 or other computer-readable media. FIG. 9 illustrates that the electronic device 900 may include the main PCB 608, a button 902, such as buttons 110, and communication interfaces 904. In the example of FIG. 9, the microcontroller 704 may be disposed on or otherwise communicatively coupled to the main PCB 608. Further, the power module 702 may be disposed on or otherwise communicatively coupled to the main PCB 608. While not illustrated in FIG. 9, one or more other components may be disposed on or otherwise communicatively coupled to the main PCB 608 (see e.g., FIGS. 6 and 7). Further, while not illustrated in FIG. 9, one or more other components may be disposed on or otherwise communicatively coupled to the power module 702 (see e.g., FIG. 8).

Depending on the configuration of the electronic device 900, the memory 714 may be an example of non-transitory computer storage media and may include volatile and non-volatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the microcontroller 704 directly or through another computing device. Accordingly, the memory 714 may be computer-readable media able to maintain instructions, modules or components executable by the microcontroller 704.

The memory 714 may be used to store any number of functional components that are executable by the microcontroller 704. In some implementations, these functional components comprise instructions or programs that are executable by the microcontroller 704 and that, when executed, implement operational logic for performing the actions attributed above to the electronic device 900. Functional components of the electronic device 900 stored in the memory 714 may include one or more components for controlling and managing various functions of the electronic device 900. Depending on the type of the electronic device 900, the memory 714 may also optionally include other functional components, which may include applications, programs, drivers and so forth.

The memory 714 may also store data, data structures, and the like that are used by the functional components. For example, data stored by the memory 714 may include the device identifier 118. The electronic device 900 may also include other data 906, which may include, for example, data used by the control logic and the other modules. Further, the electronic device 900 may include many other logical, programmatic and physical components, of which those described are merely examples that are related to the discussion herein.

In some embodiments, the one or more communication interfaces 904 may support at least a wireless connection to various networks, such as a Wi-Fi network. Further, in some cases, the one or more communication interfaces 904 may support both wired and wireless connections to various networks, such as cellular networks, radio, Wi-Fi networks, short-range or near-field networks (e.g., Bluetooth®), infrared signals, local area networks, wide area networks, the Internet, and so forth. In some cases, the communication interfaces 904 may further allow a user to access storage on another device, such as a user's computing device, a network attached storage device, or the like.

The electronic device 900 may further be equipped with various input/output (I/O) components. For instance, the electronic device may include the speaker 718, the microphone 718, the one or more light sources 706, connection ports, and so forth. Further, the electronic device 900 may include various other components that are not shown, examples of which include removable storage, a power source, such as a battery and power control unit, a global positioning system (GPS) device, a PC Card component, and so forth. Additionally, FIG. 9 illustrates a display 908, which may be passive, emissive or any other form of display, and may have a touch sensor associated therewith.

Figure 10:
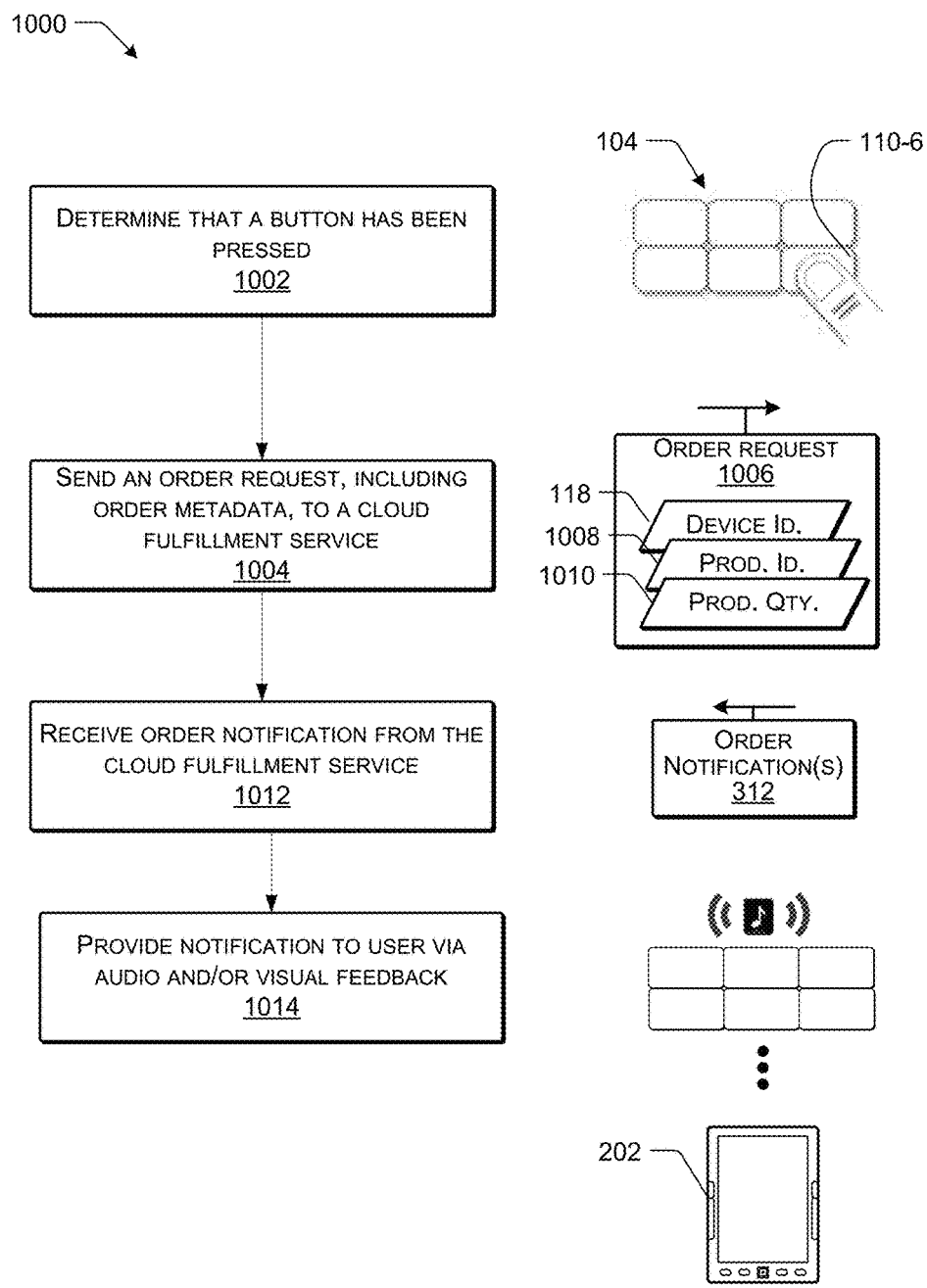
FIGS. 10-11 illustrate example processes for managing an electronic device, according to some implementations.

FIG. 10 illustrates a process 1000 for ordering or reordering an item via a fulfillment service according to some implementations. In some examples, the process 1000 may be executed, at least in part, by the electronic devices discussed above in FIGS. 1-5. The process 1000 is illustrated as a collection of blocks in a logical flow graph, which represent a sequence of operations that can be implemented in hardware, software, or a combination thereof. The blocks are referenced by numbers 1002-1012. Adjacent to the collection of blocks is a set of images to illustrate corresponding example actions. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At 1002, the electronic device may determine that a button has been pressed. For example, a user 106 (not shown in FIG. 10) may determine that they would like to reorder diapers for their infant and press a button 110-6 on the electronic device 104 associated with reordering diapers.

At 1004, the electronic device may send an order request, including order metadata, to a fulfillment service hosted by an external server. For example, the electronic device 104 may send an order request 1006 including the MAC address 118 (or other identifier type) of the electronic device 104, a SKU 1008 (or other identifier type) associated with the diapers to the fulfillment service, and a product quantity 1010 indicating the amount of diapers to order.

At 1012, the electronic device may receive an order notification from the fulfillment service. For example, the electronic device 104 may receive a message 312 from the fulfillment service 108 indicating that the diapers 310 have been ordered.

At 1014, the electronic device may provide audio and/or visual feedback to the user indicating that the order notification has been received. For example, the electronic device 104 may display a green light and generate a beep to indicate the diapers 312 have been ordered. In the event that the diapers were not ordered, the electronic device 104 may display a red light and generate a different sound. In some examples, the sound for a successful order and an unsuccessful order may be different.

In other implementations, the notification may be additionally or alternatively sent to the management device 202. This notification may be presented graphically on the display in text or graphical form.

Figure 11:
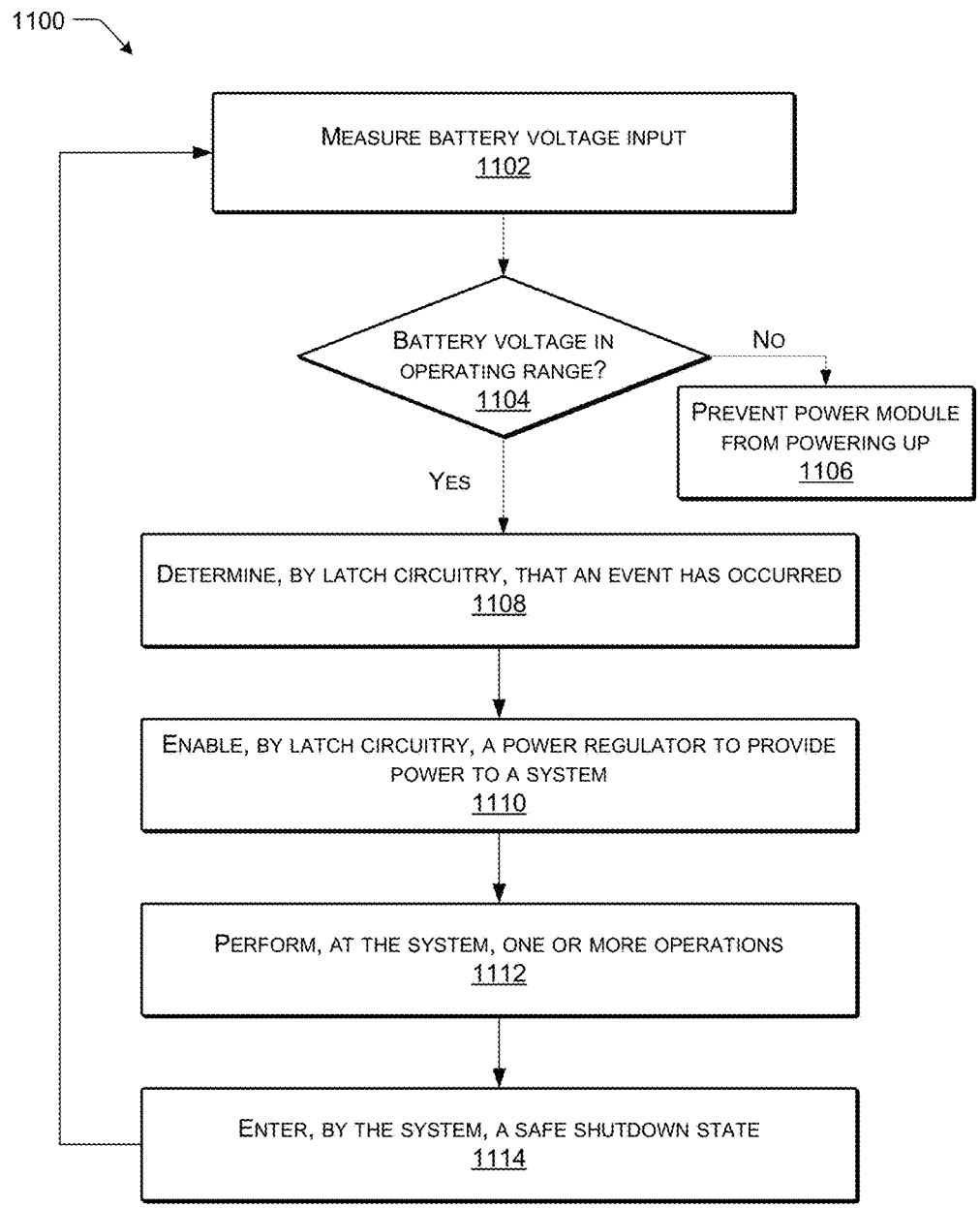

Referring to FIG. 11, an example process for maintaining the electronic device in the lowest power mode of the electronic device is illustrated and generally designated 1100.

At 1102, the process 1100 includes measuring the battery voltage input to a system. For example, the power monitoring circuitry 804 may evaluate the battery voltage within the electronic device 502.

At 1104, the process 1100 includes determining whether the battery voltage is within an operating range. To illustrate, referring to FIG. 8, the power monitoring circuitry 804 may determine, based on battery voltage input generated by the batteries 812, whether the battery voltage is below a safe operation margin.

When the battery voltage is not within the operating range (i.e., the "no" branch from 1104), the process 1100 proceeds to 1106, where the power monitoring circuitry 804 prevents the power module 702 from powering up.

When the battery voltage is within the operating range (i.e., the "yes" branch from 1104), the process 1100 proceeds to 1108. At 1108, the process 1100 includes determining, by latch circuitry, that an event has occurred. For example, the latch circuitry 802 may detect when the button 504 is pressed.

At 1110, the process includes enabling, by the latch circuitry, a power regulator to provide power to a system. For example, in response to the user 104 depressing the button 504, the power regulator 810 may provide power to the electronic device 502.

At 1112, one or more operations are performed at the system. For example, the microcontroller 608 may direct the electronic device 502 to send the order request 114 to fulfillment service 108.

At 1114, the microcontroller enters a safe shutdown state following completion of the operations. For example, the microcontroller 608 may enter the safe shutdown state after the electronic device 502 sends the order request 114 to the fulfillment service 108.

Figure 12:
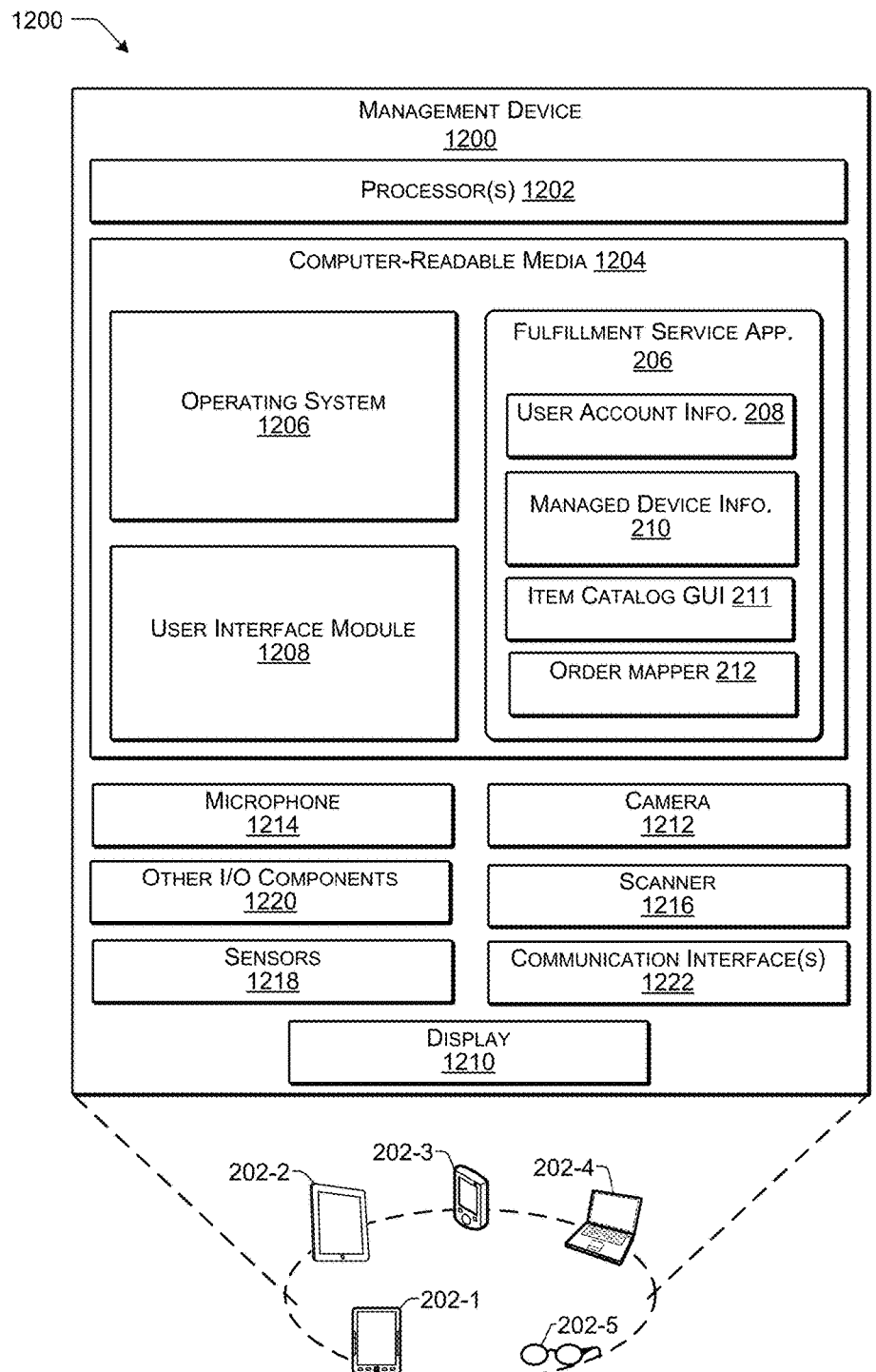
FIGS. 12-14 illustrate example processes for managing a fulfillment service, according to some implementations.

FIG. 12 illustrates select example components of the management device 202 that may be used to implement the techniques and functions described herein according to some implementations. Some common examples of the management device 202 may include digital media devices and eBook readers 202-1; tablet computing devices 202-2; smart phones and mobile devices 202-4; laptop and netbook computing devices 202-5; and wearable electronic devices 202-5. For instance, the management device 202 may be a user-transportable device, a mobile device, or other portable device, such as a cellphone, a smart phone, a tablet computing device, an electronic book (eBook) reader device, a media player, a navigation device, a portable gaming device, a laptop computer, or other typically handheld devices that are easily passed between users. Additionally, in some examples herein, the management device 202 may be a wearable device or a device that is otherwise transported by a user, such as headphones, a helmet, augmented reality glasses, an article of clothing, a device retained in an armband or supported on a belt, a watch, a bracelet, an anklet, or any other portable or mobile electronic device having components capable of performing the recognition functions described herein, and that may be moved by, carried by, worn by, or supported by a person. Additionally, in some examples, herein, the electronic device may not be a handheld or user-transportable device, an instead may be a less mobile device such as a television, desktop computer, automotive electronic device, gaming console, appliance, tool and the like.

In a very basic configuration, the management device 202 includes, or accesses, components such as at least one control logic circuit, central processing unit, or processor 1202 and one or more computer-readable media 1204. Each processor 1202 may itself comprise one or more processors or processing cores.

In addition, depending on the configuration of the management device 202, the computer-readable media 1204 may be an example of tangible non-transitory computer-readable media and may include volatile and nonvolatile memory and/or removable and non-removable media implemented in any type of technology for storage of information, such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the management device 202 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1204 may be computer storage media able to store instructions, modules or components that may be executed by the processor 1202.

The computer-readable media 1204 may be used to store and maintain any number of functional components that are executable by the processor 1202. In some implementations, these functional components comprise instructions or programs that are executable by the processor 1202 and that, when executed, implement operational logic for performing the actions attributed above to the management device 202. Functional components of the management device 202 stored in the computer-readable media 1204 may include the fulfillment service application 206, item catalog GUI 211, and the order mapper 212, which are both executable by the processor 1202 for managing an electronic device within a fulfillment service 108. Furthermore, while fulfillment service application 206, item catalog GUI 211, and the order mapper 212 are described separately herein for convenience of discussion, these components may be combined as a single piece of executable code or incorporated into a single computer program.

Other functional components may include an operating system 1206 and a user interface module 1208 for controlling and managing various functions of the management device 202 and providing basic functionality. In some examples, the operating system 1206 may manage and control at least a portion of the registration operations described herein. The fulfillment service application 206, item catalog GUI 211, and/or the order mapper 212 may be integrated into the operating system 1206, or alternatively, may be separate therefrom. Additionally, the computer-readable media 1204 may include one or more applications, such as one or more mobile applications or other types of applications that may be executed to utilize the management device 202 to perform various functions and uses.

In addition, the computer-readable media 1204 may also store data, data structures and the like, that are used by the functional components. For example, data stored by the computer-readable media 1204 may include the user account information 208 and the managed device information 210 that is used by the fulfillment service application 206. Further, the management device 202 may include many other logical, programmatic and physical components, of which those described are merely examples that are related to the discussion herein.

FIG. 12 further illustrates the display 1210, which may be passive, emissive or any other form of display, and may have a touch sensor associated therewith. The management device 202 may further include a camera 1212, a microphone 1214, a scanner 1216, as well as various types of other sensors 1218, which may include a GPS device, a gyroscope, an accelerometer, and so forth. In addition, the management device 202 may include various other types of other input/output (I/O) components 1220 such as various user controls (e.g., buttons, a joystick, a keyboard, a keypad, etc.), one or more speakers, a haptic or tactile output device, connection ports, and so forth. For example, the operating system 1206 of the management device 202 may include suitable drivers configured to accept input from a keypad, keyboard, or other user controls and devices included as the I/O components 1220. For instance, the user controls may include page turning buttons, navigational keys, a power on/off button, selection keys, and so on.

In some examples, the management device 202 may include at least one communication interface 1222. The communication interface 1222 may include one or more interfaces and hardware components for enabling communication with various other devices, such as other management device 202 or other computing devices, such as directly or over a network. For example, the one or more communication interfaces 1222 may support both wired and wireless connection to various networks, such as cellular networks, radio, Wi-Fi networks, short-range or near-field networks (e.g., Bluetooth®), infrared signals, local area networks, wide area networks, the Internet, and so forth. Additionally, the management device 202 may include a power source, such as a battery and power control unit for providing power to management device 202. Furthermore, the management device 202 may include various other components that are not shown, examples of which include removable storage, a PC card component, and so forth, depending on the configuration and purpose of the management device 202.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed in various implementations. An implementation of these modules and techniques may be stored on computer storage media or transmitted across some form of communication media.

Figure 13:
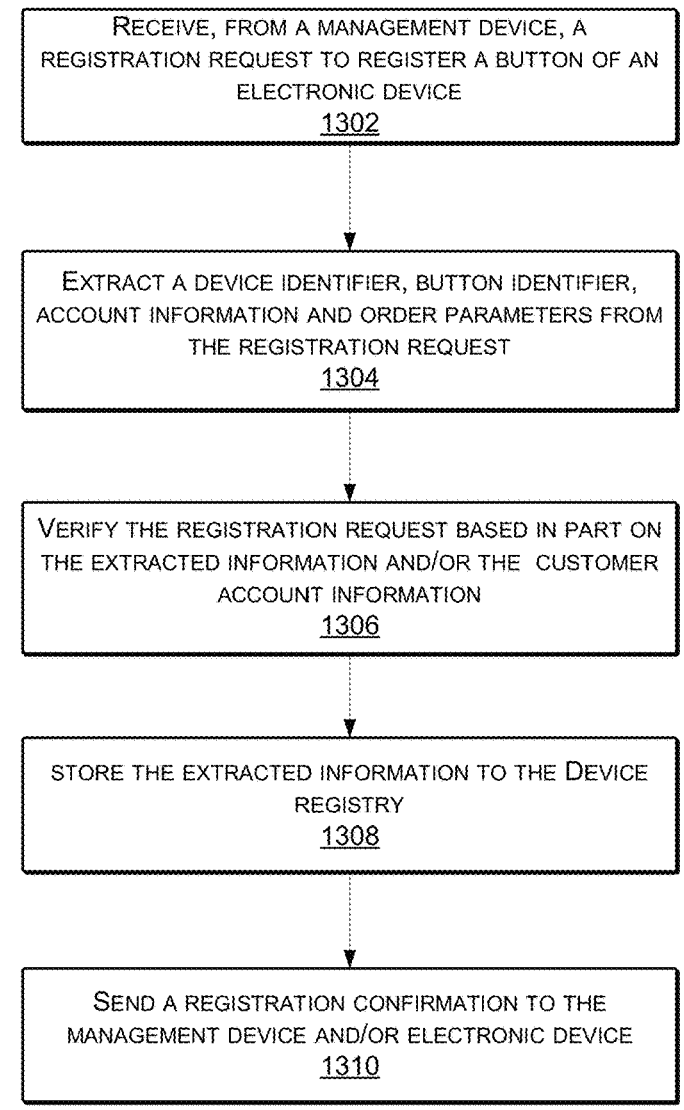

FIG. 13 shows a process 1300 for registering an electronic device with a fulfillment service according to some implementations. In some examples, the process 1300 may be executed, at least in part, by one or more modules of the fulfillment service discussed above.

At 1302, the fulfillment service may receive, from a management device, a registration request to register a button of an electronic device. For instance, a management device 202 may send a registration request 220 to the fulfillment service 108. The registration request 220 may include the MAC address 118 of an electronic device 104, the identifier 216 representing the button of the electronic device 104 to be configured, a username/password pair 218, and the order parameters 214 (e.g., three boxes of diapers).

At 1304, the fulfillment service may extract the device identifier, button identifier, account information, and order from the registration request. For instance, the device configuration service 228 may extract the MAC address 118, the button identifier 216, the username/password pair 218, and the order parameters 214 from the registration request 220.

At 1306, the fulfillment service may verify the registration request based in part on the extracted information and the customer account information. For example, the device configuration service 228 may authenticate the extracted username/password combination. In other examples, the device configuration service 228 may verify that a customer account associated with the username/password combination 218 is authorized to configure the electronic device 104 and/or order three boxes of diapers.

At 1308, the fulfillment service may store the extracted information to the device registry. For example, the device configuration service 228 may create an entry, in a data structure of the device registry 230, associating the second button 110-2 of the electronic device 104 to the username and order parameters representing three boxes of diapers. In some examples, the device configuration service 228 may authenticate the username/password combo 218 prior to creating the registry entry. In other examples, the device configuration service 228 may verify that a customer account associated with the username/password combination 218 is authorized to configure the electronic device 104 and/or order three boxes of diapers.

At 1310, the fulfillment service may send a registration confirmation to the management device and/or electronic device 104 indicating whether the request was accepted or denied. For example, the device configuration service 228 may send a message 236 to the management device 202 indicating that the second button 110-2 of the electronic device 104 is currently configured to order three boxes of diapers.

In some examples, the fulfillment service 108 or an entity associated with the fulfillment service 108 may pre-configure at least one of the account information or order parameters mapped to a button 110 of the electronic device 104. For instance, a diaper manufacturer may configure the electronic device 104 to order three boxes of diapers from the fulfillment service 108. Once the electronic device 104 is configured, the diaper manufacturer may distribute the electronic device 104 to a prospective consumer 106. Further, the fulfillment service 108 or the entity associated with the fulfillment service 108 may determine whether prospective consumers are authorized to modify the pre-configured account information and/or order. For instance, the diaper manufacturer may indicate to the fulfillment service 108 that accounts associated with consumers may not modify the order associated with the electronic device 104. As such, the prospective consumer 106 would only be able to use the electronic device 104 to order diapers.

Figure 14:
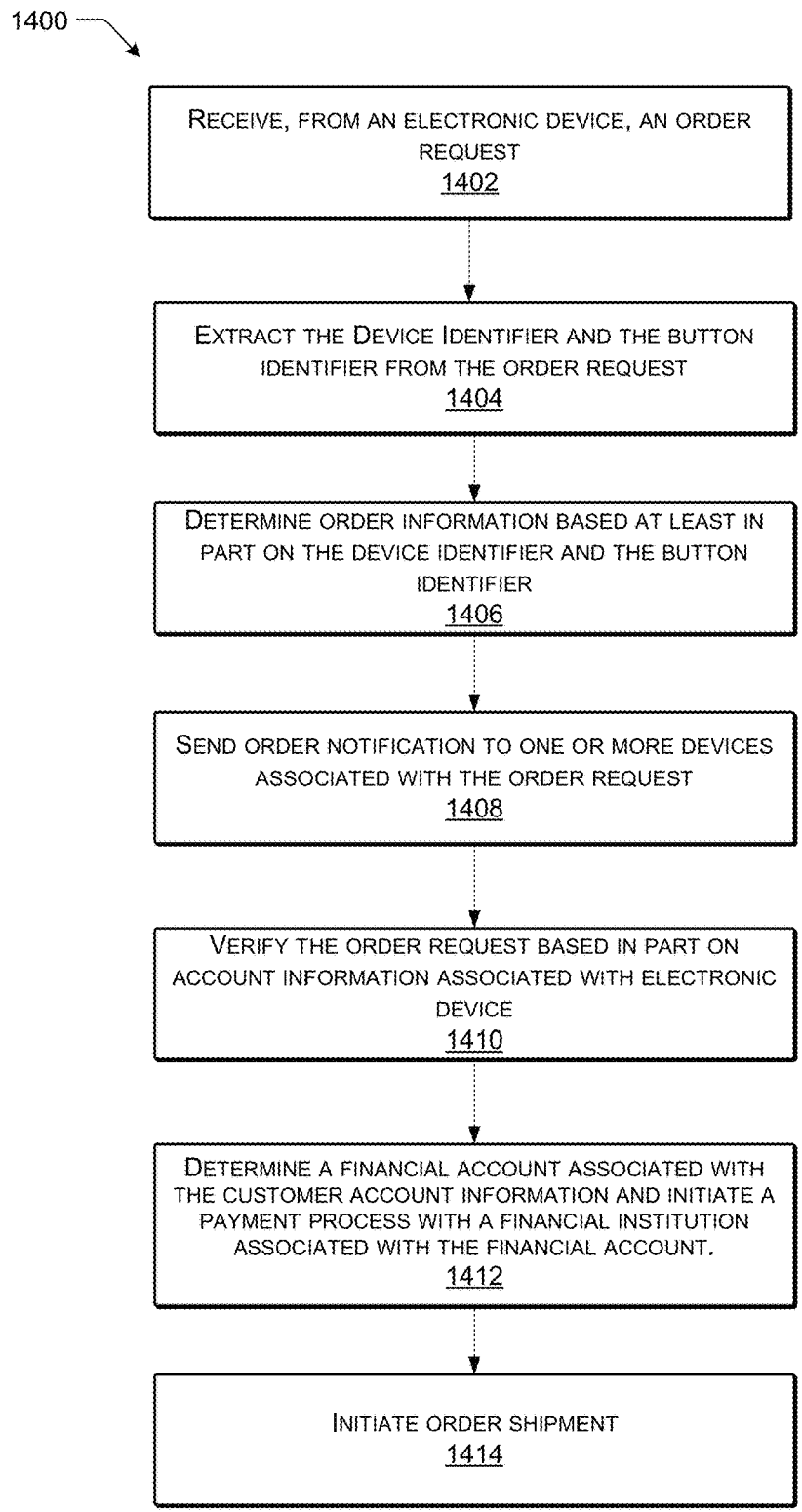

FIG. 14 is a flow diagram of a process 1400 for managing an order request according to some implementations. In some examples, the process 1400 may be executed, at least in part, by one or more modules of the fulfillment service discussed above.

At 1402, the fulfillment service may receive, from an electronic device, an order request. In some examples, the order request 114 may include the device identifier 118 and the button identifier 120. For instance, the user 106 may determine that the user's snack supply is low. As a result, the user 106 may press a button 110 on the electronic device 104 labeled "snacks." In response, the electronic device 104 may send an order request 114 to the fulfillment service 108 that includes a manufacturer serial number 118 of the electronic device 104 and an identifier 120 of the button 110 labeled "snacks."

At 1404, the fulfillment service may extract the device identifier and the button identifier. For instance, the order/reorder service 306 may extract the manufacturer serial number 118 and the button identifier 120 representing the button 110 labeled snacks.

At 1406, the fulfillment service may use the extracted device identifier and the button identifier to determine information associated with the order request. For instance, the order/reorder service 306 may search the device registry 230 with the manufacturer serial number 118 and the button identifier 120 to determine that the order request 114 is for three bags of potato chips, four boxes of microwavable popcorn, and a tub of pretzels, and that the order request 114 was submitted by the electronic device 104 associated with the customer account with the email address john.d@doe.com.

At 1408, the fulfillment service may verify the order request based in part on customer information associated with the electronic device. For example, the order/reorder service 306 may retrieve a record of previous orders submitted by the customer account with the email address john.d@doe.com. Further, the order/reorder service 306 may determine that order request 114 is valid based in part on the temporal attributes of the order request 114 matching the order frequency of potato chips, microwaveable popcorn and pretzels by the customer account associated with the email address john.d@doe.com.

At 1410, the fulfillment service may send an order notification to one or more devices associated with the order request. For example, the order/reorder service 306 may send a message 314 to the electronic device 104 indicating that the order request 114 for three bags of potato chips, four boxes of microwavable popcorn and a tub of pretzels has been accepted. Further, the order/reorder service 306 may send an email to john.d@doe.com indicating that the order request 114 for three bags of potato chips, four boxes of microwavable popcorn and a tub of pretzels has been accepted. In some examples, the email may include instructions the user 106 may follow to modify or cancel the order request 114. For instance, the email may include a link the user 106 may visit to increase the quantity of at least one of the potato chips, microwaveable popcorn or pretzels in the order request 114.

At 1412, the fulfillment service may determine a financial account associated with the customer account information and initiate a payment process with a financial institution associated with the financial account. Some examples of a financial account may include a credit card account, checking account, savings accounts, customer rewards account, etc. Further, some examples of a financial institution may include a bank, credit card issuer, or any other financial institution that may provide an account from which monetary funds are transferred. In addition, the payment process may include at least one of authorization of the order transaction, settlement of the order transaction, and/or transfer of funds.

For example, the order/reorder service 306 may determine a credit card account for the customer account associated with the email address john.d@doe.com. In some examples, the credit card information may be retrieved from the customer account information 234. Further, the order/reorder service 306 may send an authorization request to a financial institution associated with the credit card information for a transaction including the three bags of potato chips, four boxes of microwavable popcorn and a tub of pretzels. In some examples, the order/reorder service 306 may apply one or more discounts to the cost of the order items 312 based upon information stored in the customer account information 234.

At 1414, the fulfillment service may initiate the shipment of the items of the order to the user. For instance, the order/reorder service 306 may send a fulfillment request 316 to a fulfillment system 304 hosted by an external server. In some examples, the fulfillment request 316 may include one or more identifiers (e.g., product name, Universal Product Code, Stock-Keeping Unit code, etc) of the order items 312 and shipping information associated with the order request 114. For instance, the order/reorder service 306 may send a fulfillment request 316 to the fulfillment system 304 including the SKU codes of the potato chips, microwavable popcorn and pretzels, and a shipping address for the customer account associated with the email address john.d@doe.com. Further, the order/reorder service 306 may send a shipment notification 314 to one or more devices associated with the order request 114. For example, order/reorder service 306 may send a message 314 to the fulfillment service application 206 registered to john.d@doe.com indicating that the order request 114 for three bags of potato chips, four boxes of microwavable popcorn and a tub of pretzels will ship immediately. Further, the message 314 may include instructions the user 106 may follow to return the order items 312 once they have arrived.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   an electronic device having a device identifier and comprising an actuatable button, a wireless interface, a memory and a controller;
   one or more servers comprising:
   a device registry that includes information linking the device identifier to a particular product and a corresponding particular customer identifier; and a customer account database that includes information linking the particular customer identifier to customer account information;

wherein the electronic device is configured to send, via the wireless interface, to the one or more servers, the device identifier in response to actuation of the actuatable button;

wherein the one or more servers are programmed to:
determine the particular product based on the device identifier;
determine the particular customer identifier based at least in part on the device identifier;
determine the customer account information from the customer account database based at least in part on the particular customer identifier, the customer account information including an address;
generate an order based on the particular product and the customer account information; and
communicate the order to a fulfillment service to initiate shipment of the particular product to the address.

2. The system as recited in claim 1, wherein the device registry further includes information linking the device identifier to a shipping quantity to include in the order, and wherein the one or more servers are programmed to determine the shipping quantity based at least in part on the device identifier.

3. The system as recited in claim 1, wherein the one or more servers are further programmed to:
determine an average quantity of the particular product ordered over a first period of time;
determine a quantity of the particular product ordered over a second period of time, wherein the second period of time is of a same duration as the first period of time; and
determine that the quantity of the particular product ordered is less than or equal to the average quantity of the particular product ordered.

4. The system as recited in claim 1, wherein the one or more servers are further programmed to:
determine an average amount of money spent by a customer associated with the customer account information over a first period of time;
determine an amount of money spent by the customer over a second period of time, wherein the second period of time is of a same duration as the first period of time; and
determine that the amount of money spent by the customer is less than or equal to the average amount of money spent by the customer.

5. A method comprising:
detecting, by an electronic device, actuation of a button of the electronic device, wherein the electronic device is associated with a particular product;
sending, by the electronic device, an order request to an external server, wherein the order request includes at least one of a product identifier that identifies the particular product, or a device identifier that identifies the electronic device, and the external server uses the at least one of the product identifier or the device identifier to determine the particular product and further determines user account information associated with the electronic device.

6. The method of claim 5, wherein the order request represents a first order request, the particular product represents a first product, and the electronic device comprises multiple buttons, wherein each of the multiple buttons is associated with a different product, the method further comprising:
detecting operation of a particular one of the multiple buttons; and
sending a second order request associated with the particular button, wherein the second order request includes a second product identifier that identifies a second product and the device identifier.

7. The method of claim 5, further comprising:
receiving a notification indicating that the order request has been received by the external server; and
outputting, by the electronic device, at least one of an audible sound, a textual message, or a visual indication in response to the notification.

8. The method of claim 7, wherein the notification further indicates whether the order request has been accepted, suspended or denied by a fulfillment service.

9. The method of claim 5, wherein the order request further includes a product quantity.

10. A method comprising:
receiving an order request from an electronic device that is configured to order one or more items, wherein the order request includes a device identifier that identifies the electronic device;
determining information about a particular item based on the device identifier;
determining a quantity of the particular item to be shipped; and
causing shipment of the quantity of the particular item.

11. The method as recited in claim 10, wherein causing shipment further comprises:
determining a particular customer identifier using the device identifier;
determining customer account information using the particular customer identifier; and
sending the customer account information to an external server.

12. The method as recited in claim 11, further comprising:
determining a quantity of the particular item ordered over a period of time; and
denying the order request if the quantity of the particular item ordered exceeds a threshold amount.

13. The method as recited in claim 11, further comprising:
determining an average amount of money spent by a customer associated with the customer account information over a first period of time;
determine an amount of money spent by the customer over a second period of time, wherein the second period of time is of a same duration as the first period of time; and
denying the order request based at least in part on the amount of money spent by the customer exceeding the average amount of money spent by the customer by a threshold amount.

14. The method as recited in claim 11, further comprising:
determining an average quantity of the particular item ordered over a first period of time;
determining a quantity of the particular item ordered over a second period of time, wherein the second period of time is of a same duration as the first period of time; and
denying the order request based at least in part on the quantity of the particular item ordered exceeding the average quantity of the particular item ordered by a threshold amount.

15. The method as recited in claim 10, wherein the customer account information includes at least one of a bank account information, credit card account information, or rewards account information, the method further comprising initiating a payment process with a financial institution associated with the customer account information.

16. A device comprising:
    one or more processors;
    a device registry;
    a customer account database;
    a communication interface;
    one or more computer-readable media; and
    processor-executable instructions maintained on the one or more computer-readable media which, when executed by the one or more processors, program the one or more processors to:
    receive, via the communication interface, an order request from an electronic device, wherein the order request includes a device identifier that identifies the electronic device;
    determine a particular product associated with the device identifier based at least in part on information stored in the device registry;
    determine a particular customer identifier associated with the device identifier based at least in part on information stored in the device registry;
    determine customer account information from the customer account database based at least in part on the particular customer identifier; and
    generate an order based on the particular product and the customer account information.

17. The device as recited in claim 16, wherein the processor-executable instructions further program the one or more processors to:
    determine a validity of the order request based at least in part on the customer account information;
    determine a shipping address associated with the particular customer identifier based at least in part on the customer account information; and
    communicate the order to a fulfillment service to initiate shipment of the particular product to the shipping address.

18. The device as recited in claim 17, wherein the processor-executable instructions further program the one or more processors to:
    determine a shipment quantity associated with the device identifier based at least in part on information stored in the device registry; and
    communicate the shipment quantity to the fulfillment service.

19. The device as recited in claim 17, wherein the processor-executable instructions further program the one or more processors to:
    determine a financial account associated with the customer account information; and
    initiate a payment process with a financial institution associated with the financial account.

20. The device as recited in claim 17, wherein determining the validity of the order request includes:
    determining a quantity of the particular product ordered over a period of time; and
    denying the order request if the quantity of the particular product ordered exceeds a predefined threshold.

* * * * *